Dec. 20, 1966    M. L. KLEIN ETAL    3,293,608
HIGH SPEED DATA CONVERSION AND HANDLING
Filed April 17, 1957    21 Sheets-Sheet 1

INVENTORS.
MARTIN L. KLEIN
HARRY C. MORGAN
RICHARD B. RUSH
BY

ATTORNEY

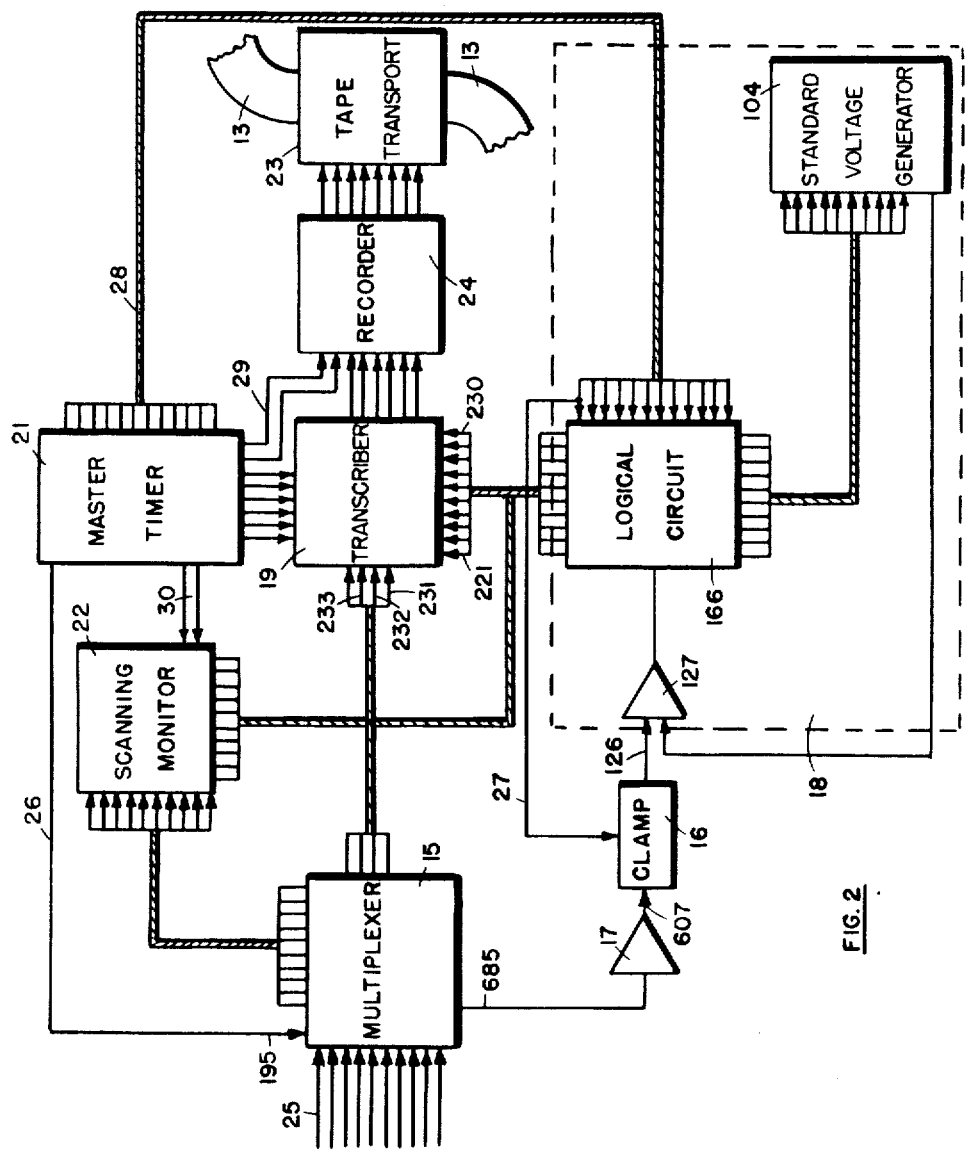

CATHODE FOLLOWER OUTPUT VOLTAGES

FIG. 9

*INVENTORS.*
MARTIN L. KLEIN
HARRY C. MORGAN
RICHARD B. RUSH
BY *Frederic B. Schwarm*
ATTORNEY Dec. 20, 1966

M. L. KLEIN ETAL 3,293,608

HIGH SPEED DATA CONVERSION AND HANDLING

Filed April 17, 1957

INVENTORS.
MARTIN L. KLEIN
HARRY C. MORGAN
BY RICHARD B. RUSH

Frederic B. Schramm

ATTORNEY

PULSE SHAPER OUTPUT VOLTAGES

STANDARD VOLTAGE GENERATOR OUTPUT VOLTAGE

ANALOG IS 4.48 V

TRIGGER OUTPUT VOLTAGE

Dec. 20, 1966   M. L. KLEIN ETAL   3,293,608
HIGH SPEED DATA CONVERSION AND HANDLING
Filed April 17, 1957   21 Sheets-Sheet 16

INVENTORS.
MARTIN L. KLEIN
HARRY C. MORGAN
BY RICHARD B. RUSH

ATTORNEY

Dec. 20, 1966 M. L. KLEIN ETAL 3,293,608
HIGH SPEED DATA CONVERSION AND HANDLING
Filed April 17, 1957 21 Sheets-Sheet 19

*INVENTORS.*
MARTIN L. KLEIN
HARRY C. MORGAN
BY RICHARD B. RUSH

ATTORNEY

INVENTORS.
MARTIN L. KLEIN
HARRY C. MORGAN
RICHARD B. RUSH
BY
*Frederic B. Schramm*
ATTORNEY

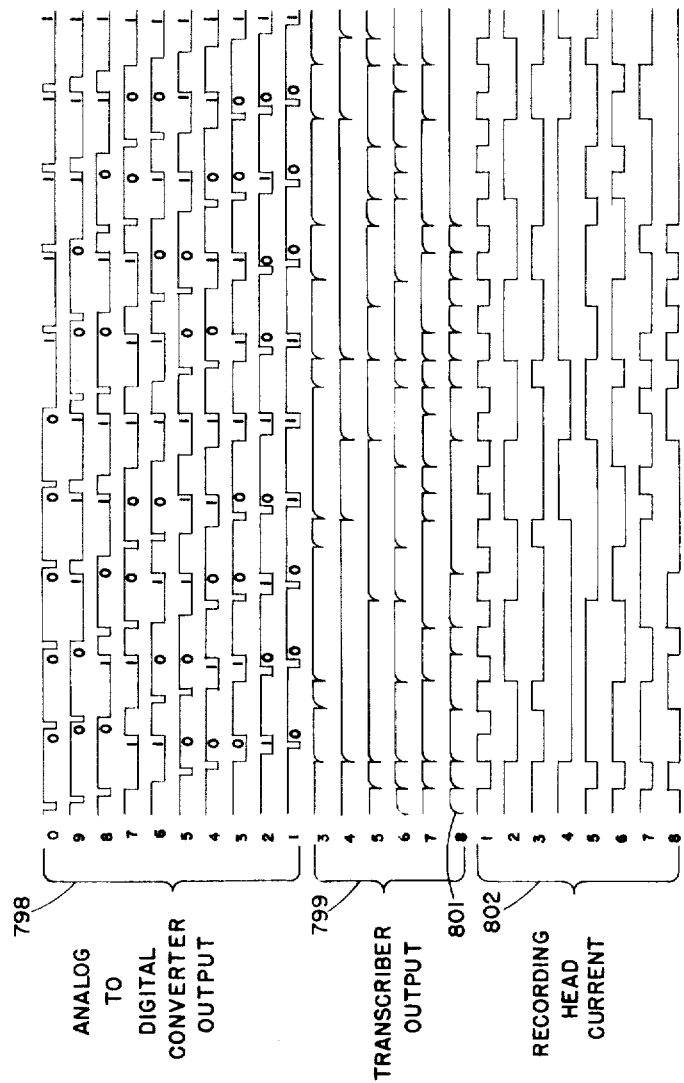

United States Patent Office 3,293,608
Patented Dec. 20, 1966

---

3,293,608
HIGH SPEED DATA CONVERSION AND HANDLING
Martin L. Klein and Harry C. Morgan, Woodland Hills, and Richard B. Rush, Granada Hills, Calif., assignors to North American Aviation, Inc.
Filed Apr. 17, 1957, Ser. No. 653,455
21 Claims. (Cl. 340—172.5)

This invention relates to data handling and concerns particularly the processing of data in digital form which is originally produced in the form of analog signals.

An object of this invention is to enable a large number of different analog signals or quantities to be received in different channels and converted to digital code at a very rapid rate of speed and processed for recording on tape or other suitable recording means for further use in digital computing mechanisms.

Certain types of information such as temperatures, pressures and the like constituting measurements of performance characteristics of such apparatus as heat engines, catalytic cracking plants and the like are most readily obtained in the form of low level analog signals. However, for determining performance of such heat engines or other apparatus for design purposes and for anticipating behavior in actual operation, it is most practical to perform computations by means of digital computers in order to perform the large number of operations required taking into consideration the number of different parameters to be considered. It is necessary, moreover, that the data be processed very rapidly and that it be received and recorded at a rate of speed that the present high speed computers are capable of receiving data.

It is, accordingly, an object of this invention to enable the low level analog data and measurements to be received very rapidly in rapid sequence and processed in a single unit for conversion to digital form and recorded in a manner which will permit playback in a manner compatible with the computer in order that the computer results may be obtained within a reasonable and practical length of time.

A further object of the invention is to accomplish a high degree of accuracy and reliability in the handling, recording, and supply of digital data to a digital computer.

Still another object of the invention is to provide practical and reliable means for identifying information supplied in different channels of the handling and recording mechanism and automatically supplying error detection code information.

A specific object of the invention is to provide a high-speed, high density, all electronic, data reduction system.

Other and further objects, features and advantages of the invention will become apparent as the description proceeds.

In carrying out the invention in accordance with a preferred form thereof, apparatus is provided comprising essentially a tape recording unit with a plurality of input channels, an intermediate tape with a tape handler and a tape playback unit. The input channels may be analog channels, as many as 100 or more, from strain gauges or thermocouple type transducers, or other devices producing low level voltages, the magnitudes of which represent various measurements or conditions required in the computation or for supervision.

The tape recording unit comprises a multiplexer for receiving the signals from the various analog input channels and supplying them to a clamp, preferably with an amplifier interposed. There is an analog to digital converter preferably of the type employing a logical matrix keyed by a master timer in such a manner that the analog signals are compared with standard voltage successively of diminishing value until any difference or error voltage falls to a predetermined minimum level. The number and type of comparisons required form a digital code representative of the analog value. A tape code transcriber is provided for preparing the digital code for a multi channel recorder monitor which in turn supplies the digital code to a tape handler in which an intermediate tape is caused to travel. A spanning monitor may also be provided for providing the recorder operator with a digital display.

The playback unit is arranged to read off the digital code in a plurality of channels as it is recorded on the intermediate tape, to separate the coded information into blocks and supply it to a plurality of separate tape recorders.

One or more of the channels are utilized for timing marks employed in keying the blocking of data read in the other channels.

A time filter is provided for enabling the user to preset the start of recording and the interval of recording in cases where only a portion of the data obtained is to be used. For use with computers which require lateral parity check bits, a redundancy generator is utilized. A word-blocking generator is provided for turning on and off input recorders for the computers and supplying blocks of data thereto at appropriate times.

A better understanding of the invention will be afforded by the following detailed description considered in conjunction with the accompanying drawings in which FIG. 1 is a block diagram of a high speed data conversion and handling system in accordance with the invention;

FIG. 2 is a block diagram of a tape recording unit employed in the system of FIG. 1;

FIG. 9 is another graph illustrating the trial voltages of FIG. 8 plotted with respect to time;

FIG. 27 is a graph of output voltages of elements synchronized by the master timer.

Like reference characters are utilized throughout the drawings to designate like parts.

Figure 1:
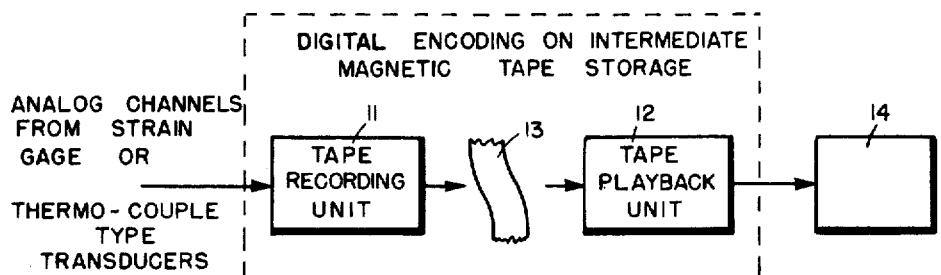

In order to illustrate a method employed in carrying out the invention and to show the correlation of parts employed in the system embodying the invention, a tape recording unit 11 and a tape playback unit 12 are represented schematically in FIG. 1 with an interposed intermediate tape 13. The system is designed for supplying signals of appropriate form to high speed digital type computers 14. For example, when employing a digital computer of the type manufactured by the International Business Machine Company under the designation EDPM 704, the system of FIG. 1 is constructed to hold up to 4,800,000 eighteen-bit words on magnetic tape. This data is obtained from one hundred input analog signals at the rate of 10,000 words per second. The information is recorded digitally on the magnetic tape 13 along with identification of source and time signals.

The intermediate magnetic tape 13 in the system used in conjunction with the specific type of digital computer mentioned holds about eight minutes of digital information at a ten-kilocycle conversion rate in the form of eighteen bit IBM half words. For supplying the computers 14 with information in form suitable for the computers 14, in this case in "IBM language," a tape playback unit 12 is provided.

The elements of the tape recording unit 11 are illustrated schematically in FIG. 2 and consist of a multiplexer 15 supplying analog signals from a plurality of channels to a clamp 16 through an amplifier 17. There is an analog to digital converter 18 interposed between the clamp 16 and a tape code transcriber 19. There is a master timer 21 timing and synchronizing the operation of the multiplexer 15, clamp 16, analog to digital converter 18, and the tape code transcriber 19. To enable the operator at the recording station to observe the operation, a spanning monitor 22 may be provided. A tape handler 23 is provided for converting electrical output of the tape code transcriber 19 into suitable magnetic impulses for recording the digital code upon the intermediate magnetic tape 13. A recorder, represented for example as an eight-channel recorder 24 is interposed between the tape code transcriber 19 and the tape handler 23. The arrangement permits physically locating the equipment necessary to produce the intermediate tape close to the test being recorded whereas the computer apparatus 14 may be located elsewhere.

In the schematic diagram of FIG. 2 a plurality of input channels entering the multiplexer 15 are represented by arrows 25 for simplicity. Likewise, for simplicity, synchronizing channels are represented by lines. There are synchronizing channels 26, 27, 28, 29 and 30, from the master timer 21 to the multiplexer 15, the clamp 16, the analog to digital converter 18, the tape code transcriber 19, and the spanning monitor 22 respectively.

Figure 3:
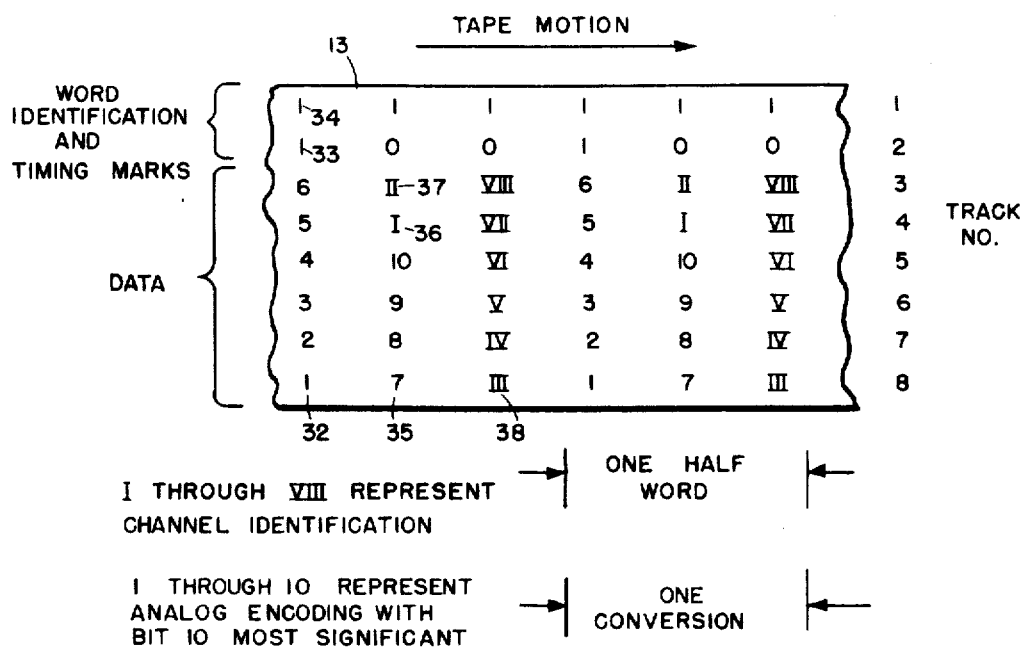
FIG. 3 is a fragmentary diagram of an intermediate recorder tape employed in the apparatus of FIGS. 1 and 2 illustrating the arrangement of the channels and record of information on the tape.

The computer mechanism 14 for which the high speed data conversion and handling system of FIG. 1 is designed, has been assumed to be of the type employing eighteen bit words. In order to simplify the handling of the data on the intermediate tape 13 and to enable ten bit conversion apparatus to be employed, the incoming data signals or words are recorded on the tape 13 as IBM half words, together with identification marks and timing marks. The arrangement of the markings is illustrated in FIG. 3.

As shown, the arrangement is such that three transverse adjacent rows of magnetic impulses on the tape 13 represent IBM half words or a single conversion. The tape 13 is eight positions wide for recording eight tracks simultaneously so that the first six positions 1 to 6 of the first row 32 are occupied by data bits. In the next position, longitudinal line 33 is occupied by timing bits and the last or upper position line 34 is also occupied by timing bits.

In transverse row 35 the positions 7, 8, 9 and 10 are indicated as occupied by further bit code signals, to make up the remainder of the ten bits of a ten bit code. Position 36 in transverse row 35 and position 37 are occupied by channel identification signals represented by I and II, respectively. In the following row 38, the successive first six positions from the lower edge of the tape are occupied by channel identification signals III to VIII, respectively. The longitudinal lines 33 and 34, however, for each row are occupied by timing marks. The tape code transcriber 19 serves for temporary buffer storage of information for releasing the analog to digital converter 18 to enable it to begin the next conversion cycle; whereas the tape 13 provides permanent storage if desired as well as permitting the recorded data to be supplied to a computer at another location.

Figure 4:
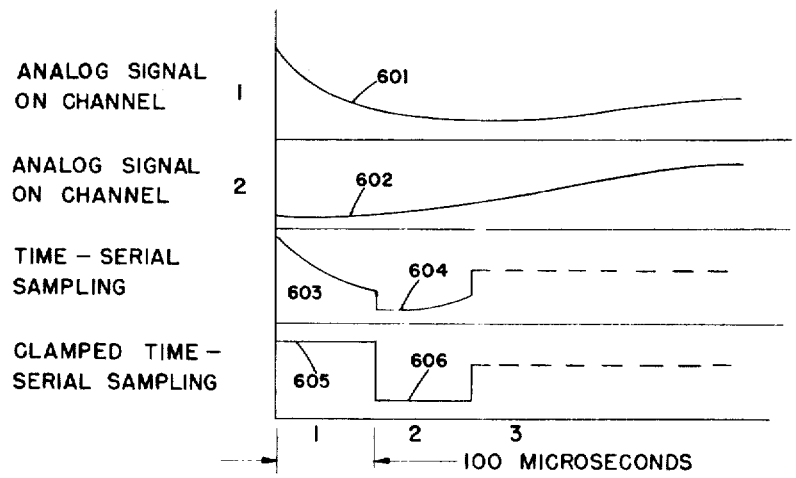
FIG. 4 is a graph illustrating the function of a clamping system holding magnitudes of continuously varying analog signals momentarily.

The amplifier 17 may be of conventional form and, therefore, is not discussed in detail herein. The clamp 16 is a suitable type of electronic clamp for accomplishing the momentary holding of continuously varying analog signals in each of plurality of different channels in succession to produce a momentary voltage level used during operation by the analog to digital converter 18. The manner of operation of the clamp 16 for two channels is illustrated in FIG. 4 where time serial sampling is employed. It is to be understood, however, that time parallel sampling may also be employed. The invention is not limited to a predetermined type of clamp but a suitable type of clamp which may be used is explained more in detail hereinafter.

Figure 10:
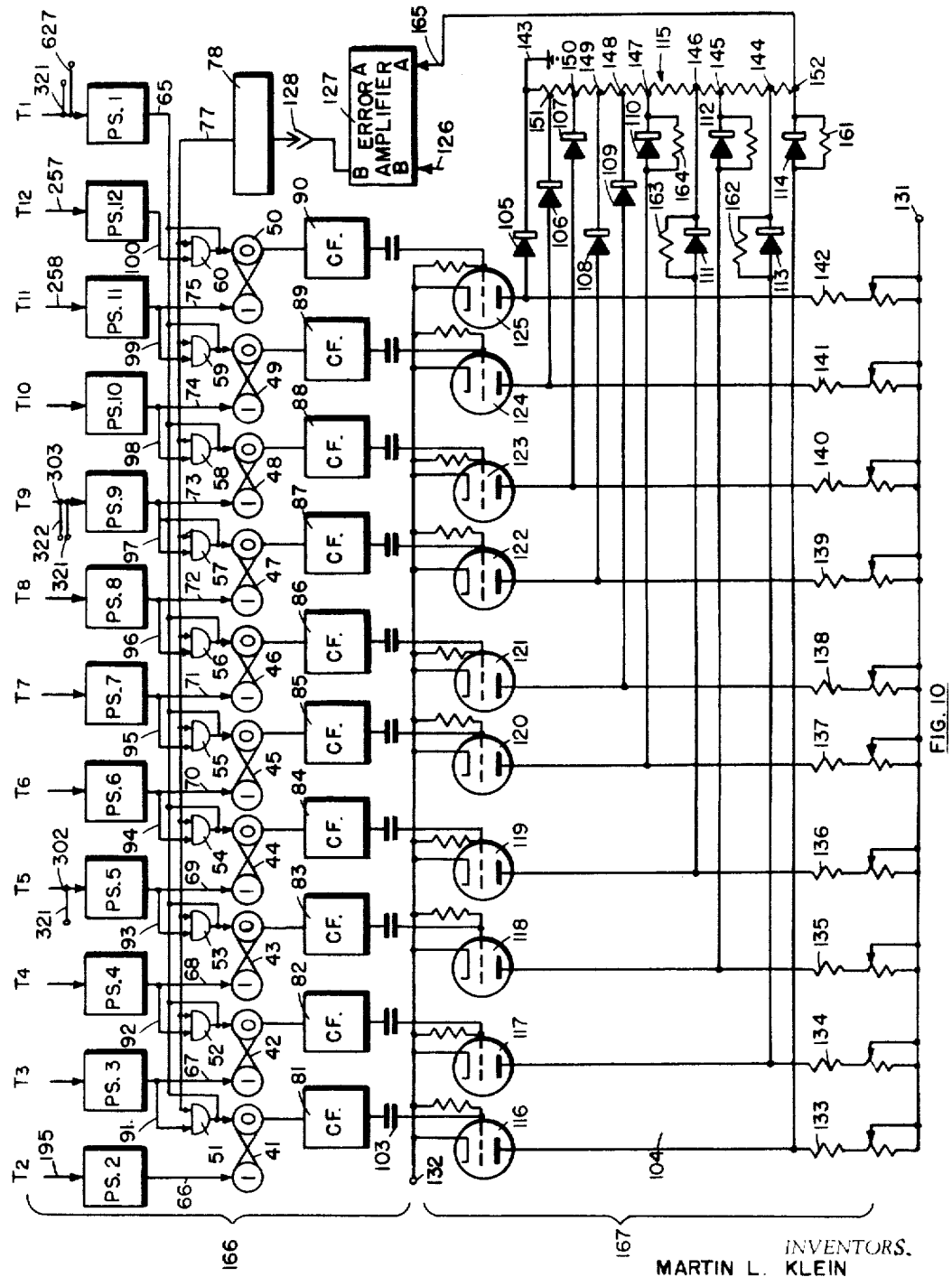
FIG. 10 is a circuit diagram partially in block form illustrating the analog to digital converter logical diagram employed.

The arrangement and connections of the analog to digital converter 18 are illustrated in FIG. 10. The converter employed is of the electronic type employing an error amplifier for comparing the voltage output of the clamp 16 with the output of a standard voltage generator having a stepped output to produce digital code signals corresponding to the successive comparison operations required until equality is reached between the clamp voltage and a fractional output of the standard voltage generator.

The apparatus of FIG. 10 is illustrated as designed for use in a system where the timer 21 produces twelve consecutive square pulses per conversion cycle (FIG. 14) in separate channels represented by numerals T1–12 in FIG. 10. For each of the timer channels T1 to T12 there is a pulse shaper designated by reference characters PS1 to PS12, respectively. The pulse shapers may take the form of differentiating circuits for converting the steep negative fronts of the square waves of FIG. 14 into sharp steep-front peaks as in FIG. 15. The pulse shapers PS1 to PS12 perform the logical switching of bistable multivibrator or electronic valve circuits or flip-flop units designated by reference numerals 41 to 50, inclusive. For each of the flip-flops 41–50, inclusive, there is a coincidence gate represented by one of the reference numerals 51 to 60, inclusive. Also, there are cathode followers represented by the reference numerals 81 to 90, inclusive.

Each of the flip flops or bistable electronic circuit devices 41 to 50, inclusive, comprises a pair of vacuum tubes in a conventional bistable circuit. One tube represents zero in binary code and the other representing one, because an input signal to the zero tube gives zero output and an input signal to the "one" tube gives one output. The output is connected to the corresponding one of the cathode followers 81 to 90. The coincidence gates 51 to 60 are likewise arranged to feed the inputs of zero tubes of the bistable circuits 41 to 50. However, each of the zero tubes of bistable circuits 41 to 50 also has resetting input through a line 65 from the pulse shaper PS1. On the other hand, each of the pulse shapers PS2 to PS11, inclusive, has a direct output to the one tube of one of the bistable circuits 41 to 49. For example, from the pulse shaper PS2, an output line 66 is connected too the unity tube 1 of the bistable circuit 41. Similarly, there are output lines 67, 68, 69, 70, 71, 72, 73, 74, 75 and 76 from the pulse shapers PS3 to PS11 to the one tube of the bistable circuits 42 to 49, inclusive.

Each of the coincidence gates 51 to 60 has two inputs, one from a line 77 constituting the output of a trigger circuit 78 and the other from one of the pulse shapers. Thus, the coincidence gate 51 has an input through the line 77 from the trigger circuit 78 and a second input through a line 91 from the pulse shaper PS3. Likewise, there are individual input lines 92 to 100, inclusive, to the coincidence gates 52 to 60 from the pulse shapers PS4 to PS12, inclusive. The outputs of the cathode followers 81 to 90 are coupled through condensers 103 to control grids of a standard voltage generator 104. The voltage generator circuit 104 employs a logical diagram including a plurality of diodes 105 to 114, inclusive, in conjunction with a fractional voltage summation resistance 115 and a plurality of electronic valves shown as triode vacuum tubes 116 to 125, inclusive. The resistance 115 provides a voltage output of the circuit 104 of coded magnitude for comparison with the signal voltage received over the line 126 from the clamp 16. An error amplifier 127 is provided, which supplies an error voltage through a disconnectable line 128 to the input side of the trigger circuit 78.

The standard voltage generator comprises, in addition to the electronic valves 116 to 125, inclusive, and the diodes 105 to 114 inclusive, a power supply having a positive terminal 131, a negative power supply having a negative terminal 132 and anode resistors 133 to 142 inclusive, corresponding to the valves 116 to 125 inclusive.

The summation resistor 115 is connected in series with the diode 114 to the anode terminal of the valve 116 and to a ground terminal 143. Intermediate taps 144, 145, 146, 147, 148, 149, 150, 151 and 152 of the resistor 115, are connected through diodes 113, 112, 111, 110, 109, 108, 107, 106, and 105 to the anode terminals of the tubes 117, 118, 119, 120, 121, 122, 123, 124 and 125, respectively. The spacing of the intermediate taps 144 to 152 of the resistor 115 is so chosen that successive taps each provide a voltage of one-half the value of the previous tap. For example, in the specific arrangement illustrated, the voltage of 10.23 volts may be obtained from the end terminal 153 of the voltage divider resistor 115 and the voltage 5.12 volts from the tap 144, voltage of 2.61 volts from the tap 145 and so on, each tap providing a voltage of half the value of the previous tap.

For the lower voltages where variations in loading of the electronic valves 116–125 according to the setting of the apparatus are insignificant, the current through the resistor 115, is determined by the amount of resistance of the resistor 115 to the load circuit of each tube and consequently voltage output is directly proportional to sum of such currents. However, for the higher voltages some compensation for changes in loading is required, and accordingly the diodes 114, 113, 112, 111 and 110 are preferably partially bypassed by resistors 161, 162, 163 and 164, respectively, having appropriately chosen resistance values.

Figure 7:
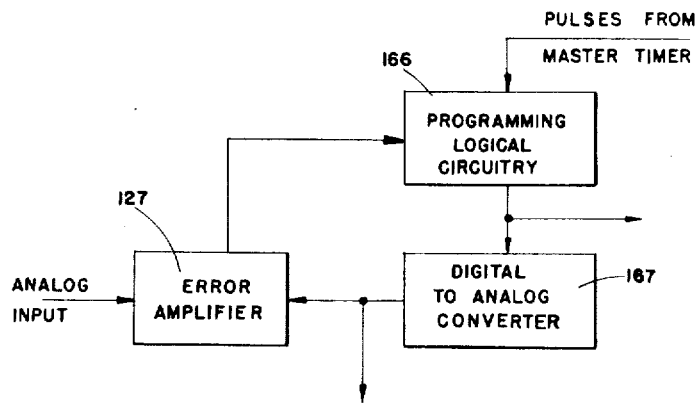
FIG. 7 is a block diagram of the system employed for converting analog to digital signals.

The manner of operation of the analog to digital converter may be explained briefly in conjunction with the schematic diagram in FIG. 7. The successive direct current voltage levels produced by the clamp 16 to represent instantaneous values of analog quantities or measurements to be encoded are converted to binary code in a programmed trial voltage encoder. This comprises programming logical circuitry 166, a digital to analog converter 167 comprising the standard generator voltage 104 and an error amplifier 127. Both the analog input at the clamp levels and signals from the standard voltage generator in the unit 167 are fed into the error amplifier 127 where a comparison is effected responsive to programming logical circuitry. The programmed logical circuitry executes a fixed program of connecting successively smaller binary voltages, the largest of which is half the full scale value.

Figure 8:
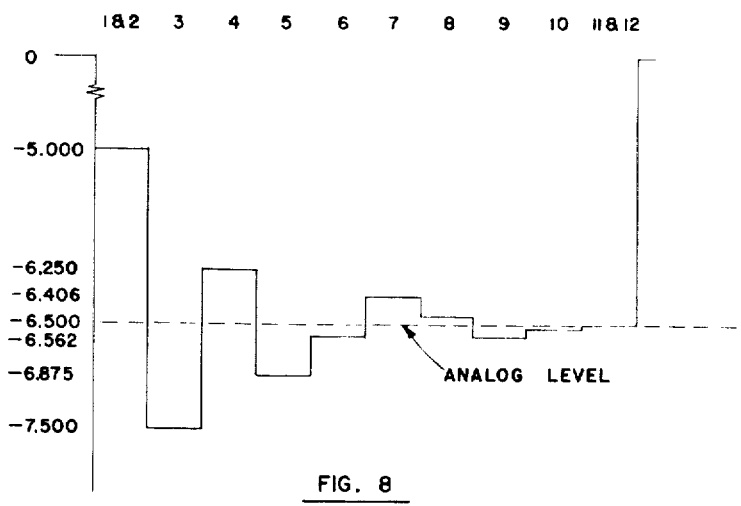
FIG. 8 is a graph illustrating the principle involved in the conversion of analog to digital signals.
Figure 9:
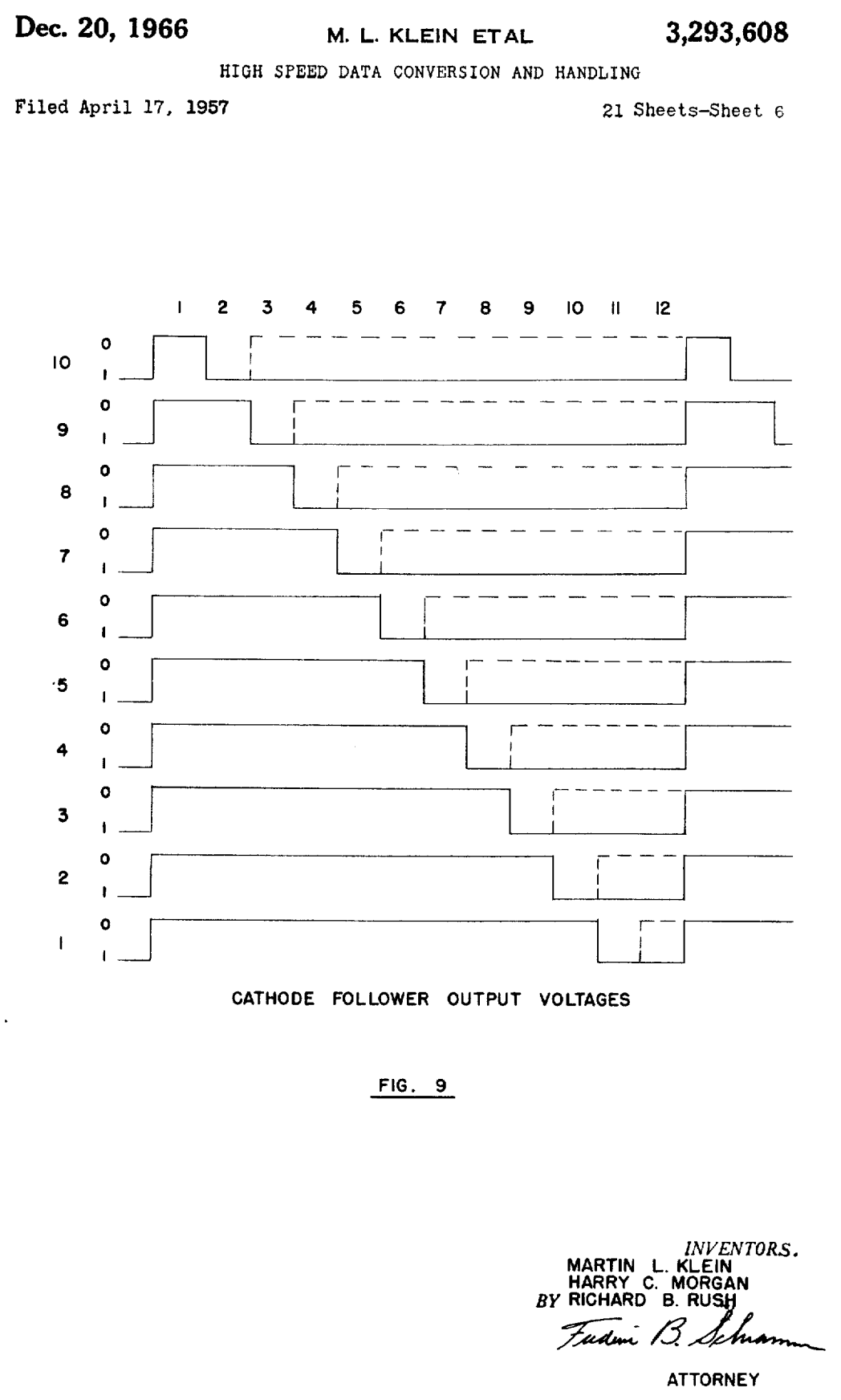

The logical circuitry is driven by a train of pulses; in the specific example illustrated, there is a train of 12 120-kilocycle pulses provided by the master timer 21 which also keys off the multiplexer 15. The trial voltages are obtained from the highly regulated voltage standard 104. The message received produces a ten bit coding of the clamped voltage by minimizing the error between the clamped voltage and the standard voltages generated. This is illustrated by FIG. 8. The timing of the trial voltages and their magnitude is shown in FIG. 9. The solid lines indicate the state attained if the sum of the trial voltage is less than the analog voltage, while the dotted lines show the resetting of the trial voltages if the trial voltage sum is greater than the analog signal in the clamp. The binary code is obtained from this program representing the digitizing of the signal.

The program logic is executed by the circuit shown in greater detail in FIG. 10. Twelve driving pulses are provided in the input channels 1 through 12 inclusive from the master timer 21 (shown in FIG. 2) which are keyed by the multiplexer 15. Of these 11 are used by the logic circuitry. The states to be held are retained or rejected by the bistable valves 41 to 50 which enable or disable the standard voltage gates represented by control grids of the valves 116 to 125, inclusive. Gating of these valves supplies standard voltages by reason of the fact that the valve anodes are connected to the successively lower points on the resistor 115 as previously explained, and the outputs are summed by reason of the fact that the signal outputs of the anodes of valves 116 to 125 flow in parallel through the common portions of the resistor 115. The voltage sum accordingly is applied to one input terminal 165 of the error amplifier 127 which receives the clamped analog voltage through the channel 126.

It can be seen that the largest voltage is tried first and the successively smaller voltages are added to this. The operation may be illustrated by considering a single encoding when a pulse is produced through the pulse shaper PS1. The bistable valve circuit 41 is reset and the other bistable circuits 42 to 50 inclusive, are reset since the pulse shaper output line 65 is connected to the zero terminal of all the bistable circuits 41 to 50 inclusive. Upon the resetting of the bistable circuits 41 to 50 the pulse is inverted and passed through the cathode followers 81 to 90 and the coupling condensers 103 to the control grids of the valves 116 to 125 for turning on the currents therein. Negative pulses are produced at the anodes thereof which leave zero voltage at the end terminal 152 of the summation resistor 115.

When the timer 21 produces a pulse through the shaper PS2, the largest binary trial voltage 5.12 volts is generated and reaches the differential amplifier or error amplifier 127. If this voltage is less than the analog voltage, the pulse shaper PS3 opens the gate of triode 117 and adds the voltage thereof. If the output of the triode 116 exceeded the analog voltage, a pulse would have been enabled from the pulse shaper PS2, resetting the bistable circuit 41. This action proceeds through the entire conversion cycle.

The binary coding stands in the bistable circuits at the end of the conversion cycle and is gated into the buffer storage of the tape code transcriber 19. In the specific apparatus illustrated, the entire conversion is accomplished in 100 microseconds, 8⅓ microseconds being allowed for each trial voltage.

FIG. 8 illustrates the operation of the analog to digital converter when using a standard voltage generator having the full voltage output of 10 volts with a half voltage output of 5 volts. The diagram of FIG. 8 represents what happens when a clamped voltage of 6.5 volts, corresponding to an instantaneous analog value of 6.5 volts, is compared with the standard voltage level. When first compared with 5 volts, it was too small so that the next comparison was with a standard voltage, one-half greater, or 7.5 volts. However, since 7.5 volts is too large, the next comparison is with a standard voltage decreased by half of what was previously added or 6.25 volts. This, however, is too small so that the operation is continued with successively smaller voltages being added to the summation or subtracted until a minimum error occurs. Each time voltage is added, one of the bistable valves stands at one and each time voltage must be subtracted again, the corresponding bistable valve is left standing at zero. In this way digital code appears from the condition of the successive bistable valves in the group of valves 41 to 50 of FIG. 10.

Figure 16:
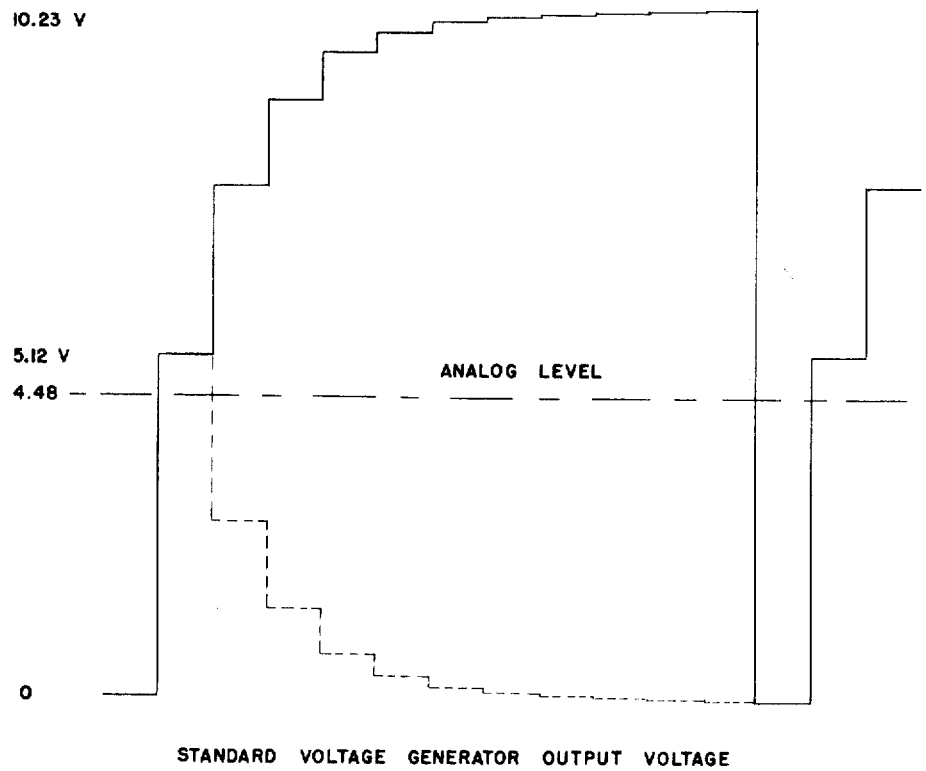
FIG. 16 is a graph illustrating the function of the analog to digital converter.

FIG. 16 illustrates the operation with a standard voltage generator having a full output of 10.23 volts. Successive possible additions are shown in full line, and possible subtractions from the initial half voltage are shown in dashed lines. It should be observed that the half-voltage of the standard voltage generator or the maximum voltage supplied by the first stage of the standard voltage generator 104, that is the output of the triode 116, is 5.12 volts. This appears at the terminal 152 as a result of the voltage division between the anode resistor 133 and the summation resistor 115. The subsequent stages are each arranged to supply sufficient current to the summation resistor 115 to increase the output voltage by steps, each equalling half of the previous step. The maximum possible output voltage in an infinite number of stages is therefore twice 5.12 volts or 10.24 volts.

Figure 17:
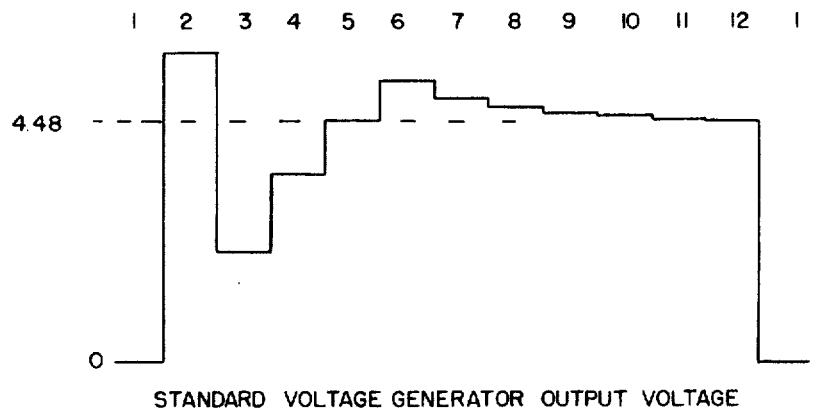
FIG. 17 is a corresponding diagram of an illustrative conversion.

FIG. 17 illustrates the necessary operations to obtain the minimum error voltage for the conditions assumed in FIG. 16. As long as the analog voltage is smaller than the output of the standard voltage generator, a negative voltage output appears at the output line 77 of the trigger 78, resulting from zero or positive output from the error amplifier 127. This resets to zero any bistable valve circuit receiving a negative peak from one of the pulse shapers PS2 to PS12 through one of the coincidence gates of the group 51 to 60.

Thus, the first step of the operation when the clamped analog voltage is first presented to the standard voltage generator through the error amplifier 127, that is during period one of FIG. 17, is that PS1 sets the output of the standard voltage generator 104 to zero volts. At period 2 the pulse shaper PS2 sets the triode 116 to give an output of 5.12 volts. Under the assumed conditions the standard voltage output is now greater than the clamped analog voltage, the trigger 78 is negative and the negative pulse is supplied to the coincidence gate 51. The negative pulse from the pulse shaper PS3 through the line 91, concurrent with the negative pulse from the trigger line 77, causes the coincidence gate 51 to transmit a pulse to the bistable circuit 41 restoring it to the zero position and thereby cancelling out the 5.12 voltage from the stage 116 of the standard voltage generator 104.

However, the negative voltage through the line 67 from the pulse shaper PS3 sets the bistable circuit 42 to the unity position, causing the stage 117 of the standard voltage generator 104 to supply its output to the summation resistor 115. This output is half that of the previous stage or 2.56 volts as represented by the level for period 3 in FIG. 17. At period 4, since the clamped analog voltage remains greater than the 2.56 voltage output of the standard voltage generator, no negative pulse is received from the line 77 by the coincidence gate 52 so that the pulse received through the line 92 from the pulse shaper 4 has no effect on the bistable circuit 42 or the stage 117 of the standard voltage generator 104. However, the negative pulse received by the next bistable circuit 43 from the pulse shaper PS4 directly through the line 68 sets the stage 118 to add a sufficient current to the summation resistor 115 to increase the output voltage after line 165 by an additional 1.28 volts which was added to the previous level of 2.56 volts as illustrated for period 4 in FIG. 17. This operates continuously over successive periods with the output voltage of the standard voltage generator rising stepwise until it again exceeds the clamped analog voltage level of 4.48 volts. Thereupon the standard voltage output decreases stepwise with successively smaller steps as shown in FIG. 17 until error is reduced to zero.

Figure 18:
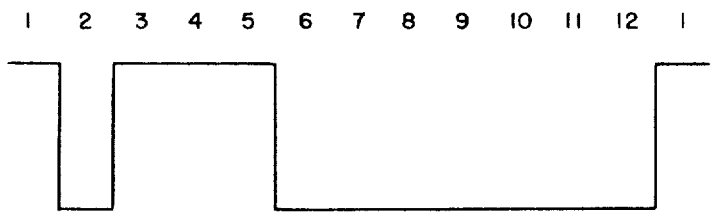
FIG. 18 is a graph illustrating the form of trigger output voltages.

FIG. 18 illustrates the square wave output voltages at different periods corresponding to the condition in FIG. 17, from which it will be seen that for period 2, where the standard voltage generator output exceeds the clamped analog voltage, the trigger supplies a negative square wave. It continues to supply the negative square wave for the periods 6 to 12 inclusive, during which the standard voltage generator output is again greater than the clamped analog voltage.

FIG. 9 illustrates the output voltage levels of the cathode followers 81 to 90 of FIG. 10, for different conditions of the bistable circuits 41 to 50 inclusive. Whenever the bistable circuit stands at one the cathode followers output is zero; when the bistable circuit stands at zero, the cathode follower output is a maximum. This is because the triodes 116 to 125 effect inversion of the voltage level supplied to the control grids. During the first period all of the cathode followers have maximum output and the bistable circuits stand at zero. During the second period the first bistable circuit may have been shifted so that during the third period the cathode follower output may again rise as represented by the dash lines in FIG. 9. Depending upon whether or not negative trigger pulses are received, the successive cathode followers are later restored to zero output or brought up again to maximum output as illustrated by FIG. 9.

The invention is not limited to the use of an error amplifier 127 and a trigger 78 employing a specific circuit.

The error amplifier 127 may, for example, take the form of the amplifier disclosed in FIG. 8–2 and described on pages 146 to 148 of Seely, Electron-Tube Circuits (1950). Preferably an error amplifier of the type manufactured and sold by Tektronix, Inc., as model No. 112 is employed. The trigger circuit 78 is preferably a Schmitt trigger circuit such as described by Von Tersch and Swago in Recurrent Electrical Transients, 1953 edition at pages 276–278.

Figure 23:
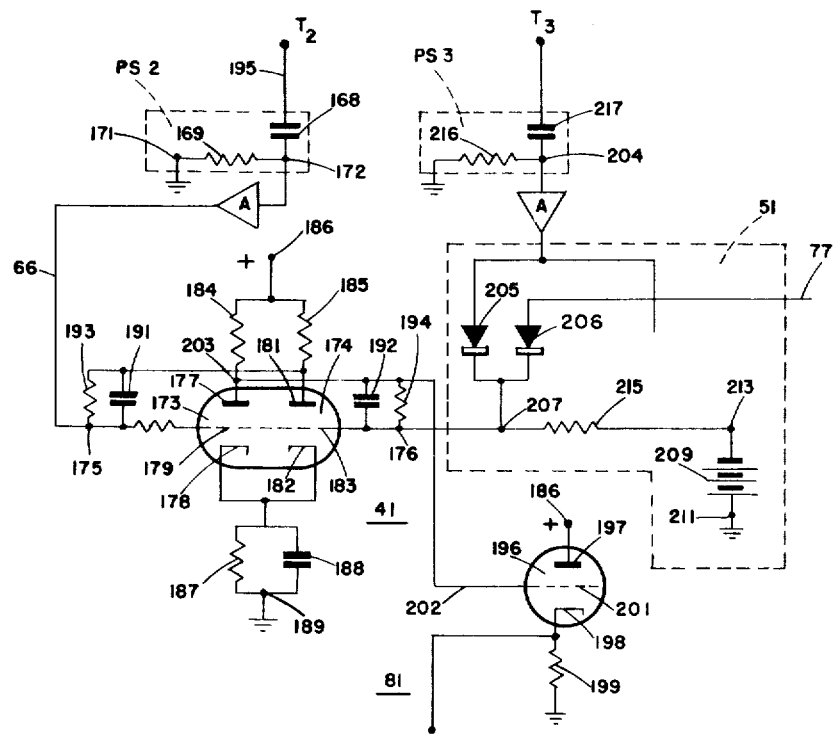
FIG. 23 is a fragmentary circuit diagram of the apparatus of FIG. 10, showing in detail connections between the bistable valve circuit and coincidence gate for one channel.

The manner in which the pulse shapers and coincidence gates co-act with the bistable circuits to control the output voltage of the standard voltage generator 104 through to the cathode followers is illustrated in the simplified circuit, FIG. 23. FIG. 23 illustrates fragmentarily a portion of the apparatus of FIG. 10 including the pulse shapers PS2 and PS3, one of the bistable valve circuits 41 and the cathode follower 81 with a coincidence gate 51. The pulse shaper PS2 comprises a condenser 168 connected in series with a resistor 169 having a ground terminal 171. There is a junction terminal 172 which serves as the output terminal of the pulse shaper PS2, the condenser 168 being connected between the junction terminal 172 and the timer terminal T2. The bistable valve circuit 41 may be of the conventional bistable multivibrator type comprising a pair of triodes 173 and 174, which may, if desired, be enclosed within a single glass envelope. There are independent input terminals 175 and 176 for producing the "one" condition and the "zero" condition, respectively.

The "one" triode 173 comprises an anode 177, cathode 178 and a control electrode or grid 179. The zero triode 174 comprises an anode 181, cathode 182 and a control electrode or grid 183. There are anode resistors 184 and 185 connecting the anodes 177 and 181, respectively, to a positive power supply terminal 186. Cathode bias is provided by means of a cathode resistor 187 by passed by a condenser 188 and connected between the cathodes 178 and 182 and a ground terminal 189. Cross couplings between the anode of one triode and the control electrode of the other triode are provided conventionally by means of coupling condensers 191 and 192, shunted by resistors 193 and 194. The one condition input terminal 175 is connected to the output terminal 172 of the pulse shaper PS2 by a conductor 195.

The cathode follower 81 comprises an electronic discharge device such as triode vacuum tube 196 having an anode 197 connected to the positive power supply terminal 186, a cathode 198 connected to the ground terminal 189 through a cathode resistor 199, and a control electrode 201 connected through a conductor 202 to an output terminal or anode terminal 203 of the one condition triode 173 of the bistable circuit 41. For the operation desired the connections are such that when a negative pulse is applied from the output terminal 172 of the pulse shaper PS2 to the bistable circuit 41, the cathode follower control electrode 201 is held positive.

The pulse shaper PS3 is similar in construction and connection to the pulse shaper PS2 with an output terminal 204.

The coincidence gate 51 comprises diodes 205 and 206 connected respectively to the output terminal 204 of the pulse shaper PS3 and the output line 77 of the trigger circuit 78. To serve as an "and" gate passing concurrent negative voltages, diodes 205 and 206 are poled with anodes connected to the elements 204 and 77 and cathodes connected to coincidence gate output terminal 207 which is connected to the zero condition input terminal 176 of the bistable circuit 41. In order to provide more powerful negative pulses, a negative supply source 209 is provided having a grounded positive terminal 211, a negative terminal 213 and a resistor 215 between the terminals 207 and 213.

The arrangement is such that with either of the connections 204 or 77 grounded, sufficient current flows through the bleed resistor 215 to hold terminals 207 and 176 positive so that no change in condition of the bistable circuit 41 is caused to take place. However, with a negative square pulse applied to the connection 77 and a sharp negative pulse appearing at the terminal 204, the positive bias effect of the resistor 215 in the pulse shaper PS3 is overcome. The source 209 is free to depress the potential of the terminal 176 abruptly so as to shift the bistable circuit 41 to the zero condition if it is not already in the zero condition.

When a negative pulse is supplied to the terminal 175, the bistable circuit 41 is shifted to the one condition, but when a negative pulse is supplied to the terminal 176 through the coincidence gate 51, the bistable circuit 41 is shifted to the zero condition. The negative pulse on the grid 183 cuts off inter-electrode current of the tube 174, with the potential of the anode 181 rising and raising the potential of the grid 179 of the triode 173 to cause it to conduct current and depress the potential of the anode terminal 203, thereby depressing the potential of the control grid 201 of the cathode follower 196 and causing the cathode 198 to fall in potential for producing positive output from the stage 116 of the standard voltage generator 104.

Figure 11:
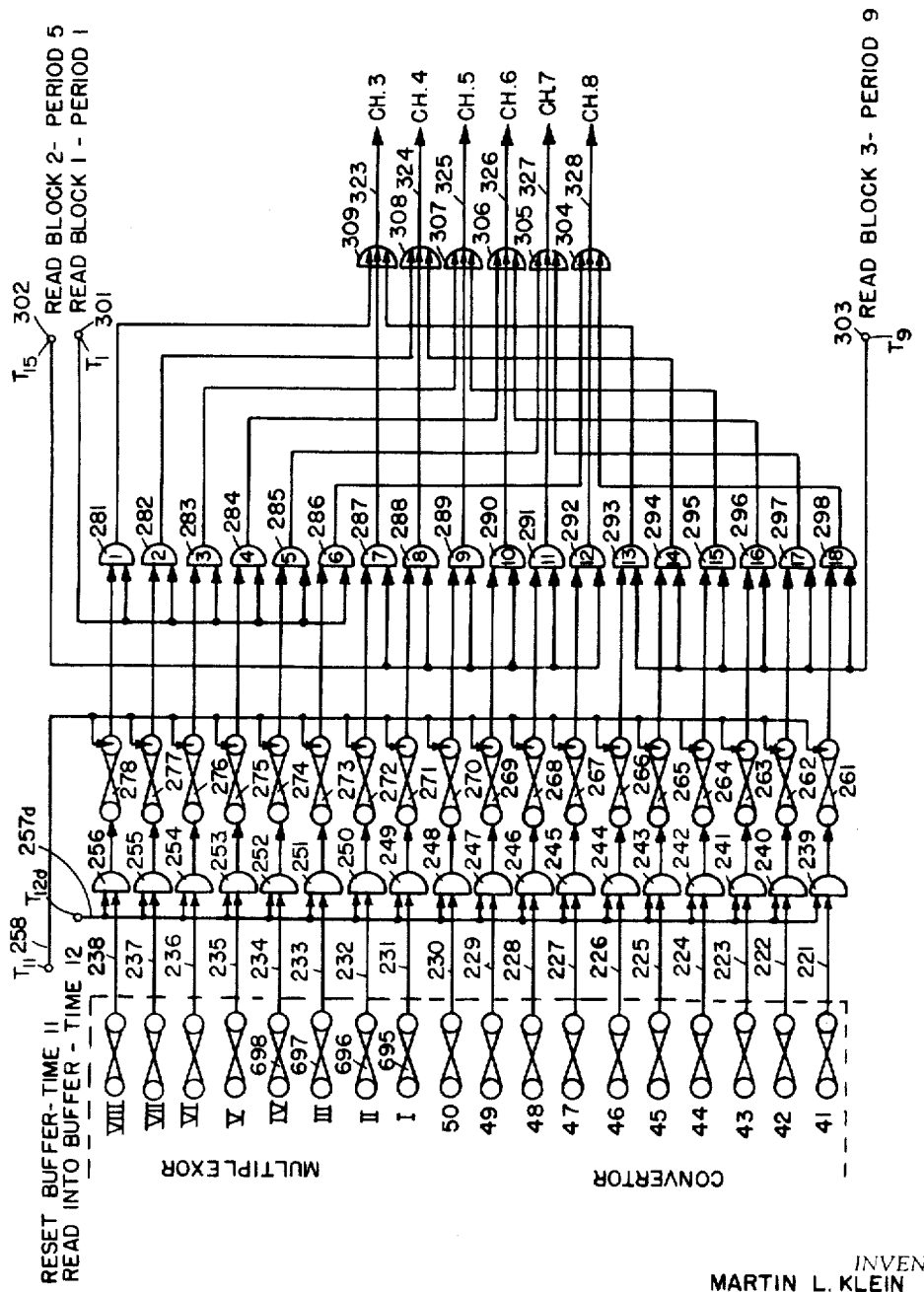
FIG. 11 is a logical diagram of the transcriber employed.

As illustrated in FIG. 11, the tape code transcriber 19 comprises connections 221 to 230 inclusive from the bistable circuits 41 to 50 of the analog to digital converter and connections 231 to 238 inclusive from bistable channel circuits I to VIII of the multiplexer 15. A plurality of coincidence gates 239 to 256 inclusive are provided, each having an input from one of the lines 221 to 238 inclusive.

For buffer storage a plurality of schematically indicated bistable circuits 261 to 278 is provided each having an input from one of the coincidence gates 239 and 256 inclusive, and an input from a buffer reset line 258 connected to terminal T11 of the timer 21. A line 257d coupled to timer terminal T12 through a delay circuit (not shown in FIG. 11) is provided for causing data to be read into the buffer 261–278. Each of the coincidence gates 239 to 256 inclusive has an input connection from the line 257.

Another set of coincidence gates 281 to 298 is provided, each having a pair of input terminals. One of the input terminals of each of the coincidence gates 281 to 298 inclusive, is connected to outputs of the bistable circuits 261 to 278 inclusive.

The remaining input terminals of the coincidence gates 281 to 298 are divided into groups or blocks, however. There is a control terminal 301 for causing the first block to be read in the first period. Input terminals of coincidence gates 281 to 286 are connected to control terminal 301. There is a second control terminal 302 to which the remaining terminals of coincidence gates 287 to 292, inclusive, are connected for causing the second block to be read in the fifth period, and there is a third control terminal 303 to which the remaining input terminals of the coincidence gates 293 to 298 are connected for causing this third block to be read in the ninth period.

Six triple-input "or" gates 304 to 309 are provided for recording in channels 3 to 8, inclusive. For example, the or gate 304 has input terminals from gates 286, 292, 298 in the group 281 to 298. The or circuits 304–309 may be in principle such as described for example, by R. K. Richards: Arithmetic Operations in Digital Computers (1955), page 32.

Or gate 305 has input terminals from the gates 297, 291 and 285 from group 281 to 298. The remaining or gates 306, 307, 308 and 309 in turn have input terminals from successive coincidence gates among the three groups into which the gates 281 to 298 are divided.

The circuit of FIG. 11 is entirely a digital circuit because the analog input voltage has been digitized. The eleventh keyed pulse of each twelve produced for each encoding cycle, resets the buffer bistable circuits; the twelfth pulse (delayed) reads the state of the converter bistable circuits and the position of the multiplexer. This is accomplished by using the bistable units of the converter and the multiplexer circuits, to enable a reading pulse which is the twelfth pulse of the chain. The bistable buffer storage now retains the half word of the previous cycle and releases the converter and the multiplexer for the next encoding cycle.

The arrangement illustrated provides for reading the buffer storage in groups of six pulses. The first reading is executed by the first pulse of the chain of keyed pulses. This is passed through gates 281 to 286 simultaneously if the count in the buffer bistable circuits enables the gate. The fifth pulse reads the bistable circuits in the next group connected to gates 287 through 292, and the ninth pulse reads out the bistable circuits connected to gates 293 through 298.

Bistable circuits 278, 272, and 266 pass through a common output 309 and all of the 18 channels are reduced in this way to only 6 outputs. As a result, 18 bits are presented serially in three readings. By using the first, fifth, and ninth pulses from the master timer 21 the spacings in time between readouts are a fixed interval, in this case 33⅓ microseconds. This permits even spacing of the digits on the intermediate tape 13. Since the outputs from the transcriber 19 are keyed by sharp negative timer pulses, the readout at lines 323–328 of FIG. 11 is in sharp-portion negative pulses.

Figure 12:
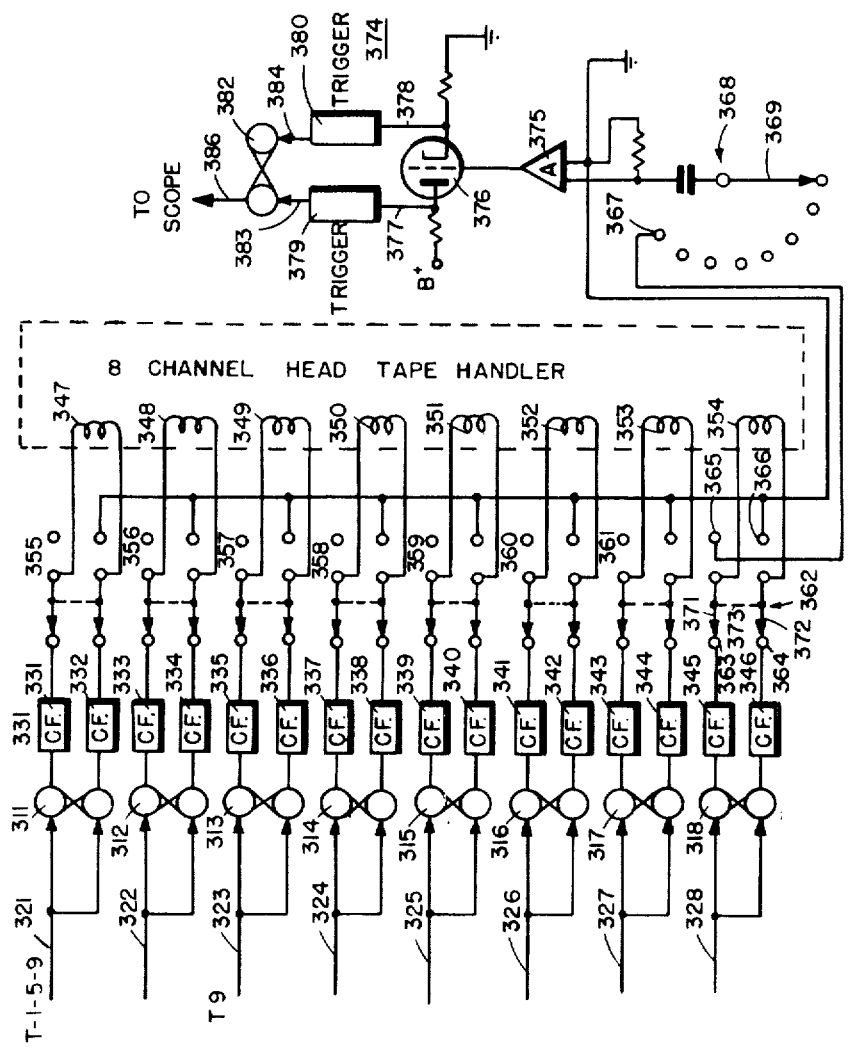
FIG. 12 is a block diagram of the eight channel tape recorder and monitor employed.

As illustrated in FIG. 12, the eight-channel tape recorder 24 comprises a plurality of bistable circuits 311 to 318 inclusive with input channels 321 to 328 inclusive. Channels 323 to 328 inclusive are the output circuits of the triple input or gates 304 to 309, inclusive, illustrated in FIG. 11. The channels 321 and 322 come directly from the master timer unit 21.

Each of the bistable circuits 311 to 318 inclusive is coupled to a pair of cathode followers 331 to 346 inclusive. The cathode followers 339 to 346 are coupled alternately to the two output stages of the bistable circuits 311 to 318. The cathode followers 331 to 346 are of conventional type having control electrodes or grids which are coupled to the bistable circuits 311 to 318. The output terminals of the cathode followers in each pair are connected across recorder head coils 347 to 354 inclusive, for supplying a current pulse in the coil wherever the state of a bistable circuit is changed by an incoming voltage pulse. Depending upon the previous state of the bistable circuit, the current flow may be in one direction or the other.

Preferably double-throw, double-pole switches 355 to 362 inclusive, are interposed between the cathode followers 331 to 346 and the recorder head coils 347 to 354. Each of the double throw switches comprises a pair of fixed terminals connected to cathode followers and a fixed terminal for test use. For example, in the case of the channel 328 the double throw switch 362 comprises a pair of fixed terminals 363 and 364 connected to the outputs of cathode followers 345 and 346 respectively, a pair of fixed terminals 365 and 366, the former of which is left unconnected and the latter of which is connected to one of the stationary terminals 367 of a selector switch 368 having a rotary blade 369. The double throw switch 362 also has a pair of movable switch blades 371 and 372 which are connected across the recorder head coil 354 as shown. The blades 371 and 372 are mechanically connected by a handle 373 so that when the blade 371 is connected to the fixed terminal 363 the blade 372 is connected to the fixed terminal 364.

Although preferably the spanning monitor 22 is employed to assist in field use of the equipment, a single play back channel 374 may be provided comprising an amplifier 375, a phase splitter 376 with a pair of output channels 377 and 378, and a pair of trigger circuits 379 and 380 connected to the splitter output channels 377 and 378 respectively. A bistable valve circuit 382 is provided with input connections from output lines 383 and 384 of the triggers 379 and 380, respectively. An output line 386 is provided from one of the bistable circuit terminals for connection to an oscilloscope which provides visual monitoring of the recorded information at any time in the field.

For this purpose one of the double throw switches 355 to 362 according to which channel is to be monitored, is changed from the position illustrated in the drawing to the opposite position whereby the corresponding recorder head coil is switched from the cathode follower output to the play back circuitry 374. The triggers 379 and 380 are arranged to be driven by negative pulses for triggering the output bistable circuit 382 to its proper state for reproducing the original input to the tape record without ambiguity.

As will be apparent from the drawings, the tape recorder illustrated in FIG. 12 is particularly simple in design. The system illustrated and described by way of example permits pulse densities of 500 pulses per channel per inch of the tape 13, making recordings at a tape speed of 60 inches per second.

Each side of each of the bistable circuits 311 to 318 biases one of the two cathode followers to which it is coupled to conduction or cutoff, depending upon its state and, thus depending on the presence or absence of a digit, magnetization of the tape 13 at saturation is obtained. The polarity of the magnetization is of no significance in the intermediate tape 13.

In addition to the six data inputs from the channels 323 to 328, inclusive, the two additional channels 321 and 322 receive pulses from the ring of twelve pulses and these are recorded as time markers and play back key pulses so that on play back, the system is driven entirely by the information recorded on the tape. As indicated diagrammatically in FIG. 3 a "one" mark is produced by the coil 347 for each timer pulse, whereas the coil 348 produces a "one" mark every third timer pulse. This is accomplished by coupling the line 321 to the first, fifth, and ninth output terminals of the timer 21, but coupling the line 322 to only the ninth output terminal.

The tape play back circuit 12 comprises eight play back elements somewhat similar to the monitoring unit described in connection with FIG. 12.

Figure 19:
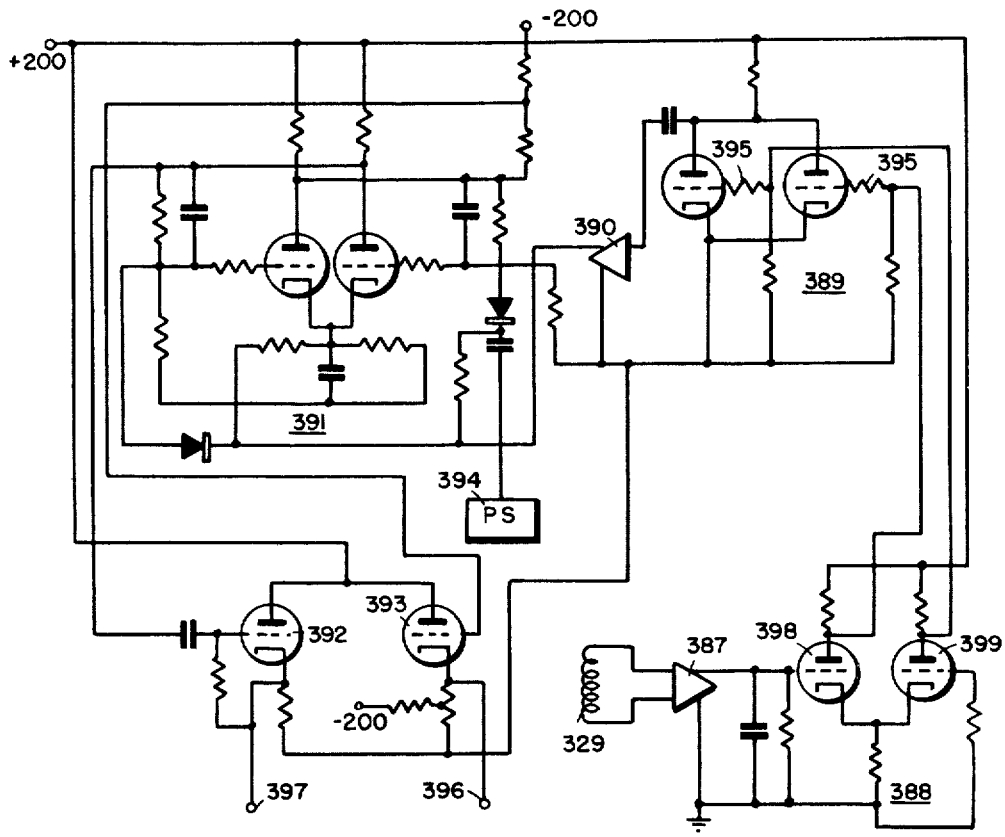
FIG. 19 is a circuit diagram of a playback channel.

A typical play back channel is illustrated in greater detail in FIG. 19, representing, for example, the channel from a play back head coil 329.

The channel comprises an amplifier 387 connected to the play back head coil 329, an inverter 388 comprising a pair of triodes, a clipper adder 389 also comprising a pair of triodes, a pulse amplifier 390 and a bistable valve unit 391. Preferably also cathode followers 392 and 393 are provided which are connected to appropriate output terminals of the bistable valve unit 391 to provide a high impedance output at a terminal 396 supplied by cathode follower 393 and a low impedance output at a terminal 397 supplied by the cathode follower 392. The pulse amplifier 390 may be of a conventional type such as that manufactured by the Eeco Production Company under the designation Z90030. The bistable valve unit 391 may be of a conventional type such as that manufactured by the Eeco Production Company under designation Z90048. Preferably a pulse shaper 394 is coupled to one of the input terminals of the bistable valve unit 391.

Similar tape play back units may be used in successive data and timer channels. The low impedance output terminal 397 is utilized for supplying the redundancy generator 402 illustrated in FIG. 13, whereas the high impedance terminal is utilized to supply the tape recorders 153 and 154 through the cable 405.

Since the arrangement is such that the tape 13 may be magnetized indifferently with one polarity or the opposite polarity to represent the digit one and remains unmagnetized to represent the digit zero, or vice versa, the tape play back is so arranged as to respond in the same manner regardless of the polarity of magnetization of the bits in the tape 13. This is necessary especially when the computer 14 is one of the type such as the IBM EPDM704 which must be supplied with a tape in which all of the bits are magnetized with the same polarity.

Accordingly the play back channels in the package 401 such as that illustrated in FIG. 19 provide outputs of the same polarity regardless of the polarity of the magnetization of the bits on the tape 13. This is accomplished by the use of the inverter 388 and the clipper adder 389. The inverter 388 produces signals of opposite polarities at the anode terminals 398 and 399 whenever a magnetized portion of the tape 13 travels under the play back coil 329. This action is independent of the polarity of the magnetized bit. The clipper adder is biased to positive cutoff as a result of the presence of the grid current limiting resistors 395. Consequently the clipper adder 389 will transmit strong negative input pulses but only very weak positive input pulses. The pulses transmitted by the clipper adder 389, therefore, are those appearing on which ever of the anodes 398 or 399 is negatively pulsed. Accordingly the polarity of the bit inducing current in the play back coil 329 is without effect on the polarity of the pulse transmitted by the clipper adder 389.

Figure 13:
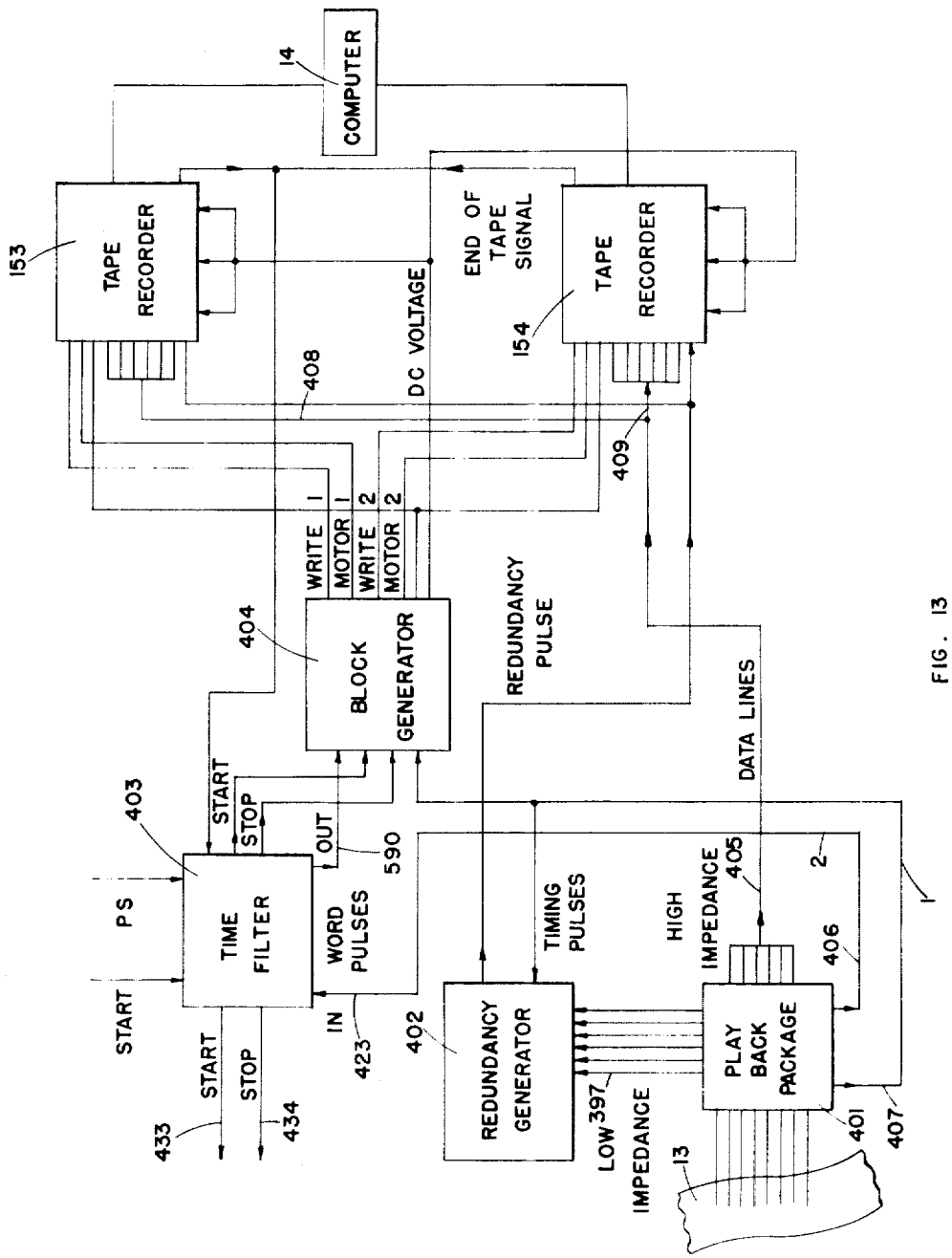
FIG. 13 is a block diagram of the playback unit employed in the system of FIG. 1.

The tape play back unit 12 as illustrated in FIG. 13, comprises a tape play amplifier 401, a redundancy generator 402, timer filter 403 and block generator or record generator 404 with interconnecting channels. The tape play amplifier 401 comprises eight play back elements such as illustrated in FIG. 19. The connections between the tape play back amplifier 401 and the block generator 404 for channels 3 to 8 are represented by a cable indicated by a single line 405. Time channel connections for channels 1 and 2 between the tape play back package and the block generator 404 are represented by single lines 406 and 407. The computers such as IBM computers for which the digital encoding system of FIG. 1 is utilized, are connected to the block generator 404 or directly to the play back package 401 by connections represented by data lines 408 and 409. When the computer 14 takes the form of an IBM EDPM704 unit schematically represented, magnetic tape recorders 153 and 154 such as IBM 727 tape units are interposed.

Figure 20:
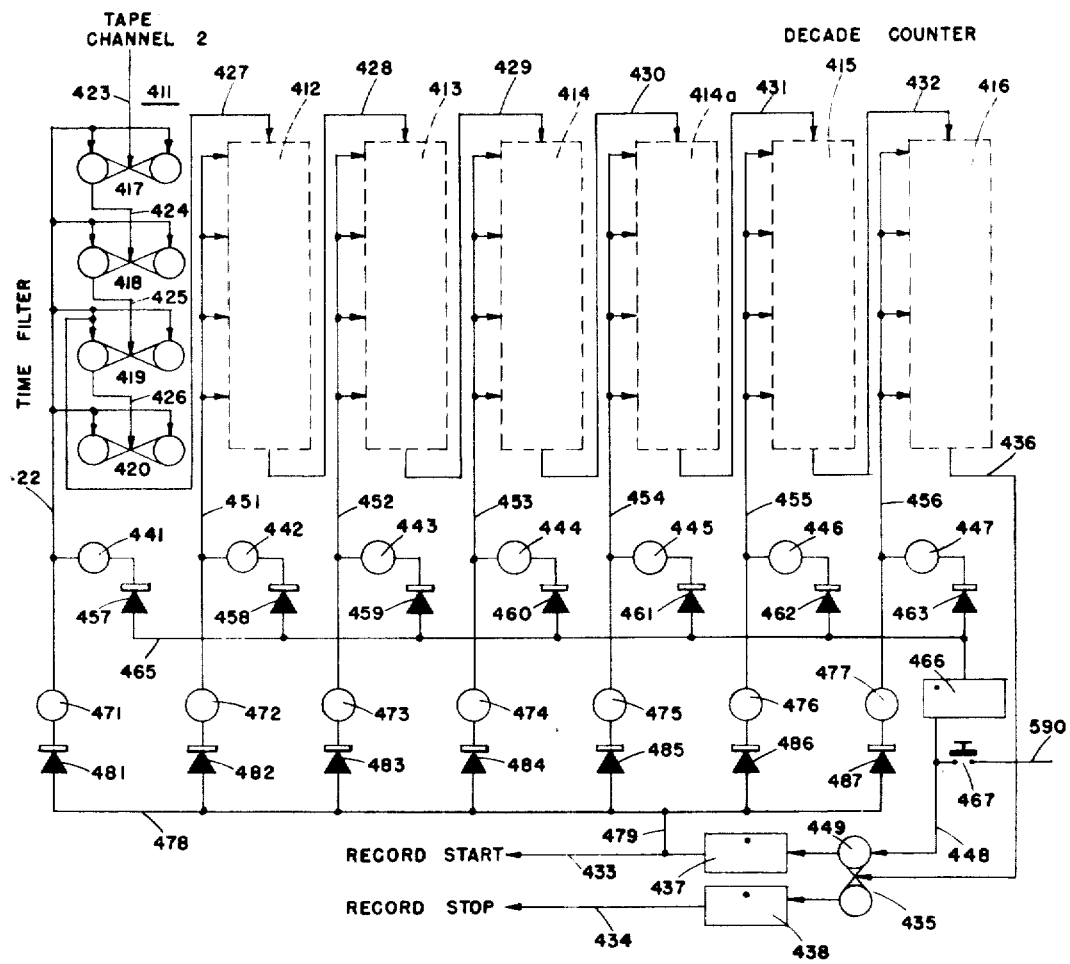
FIG. 20 is a schematic diagram of a time filter.

The time filter 403 is illustrated in greater detail in FIG. 20. It is essentially a preset counter with two sets of decimal switch banks, one for presetting the start of rerecording and the other for presetting the interval of recording desired. There is a plurality of modulus 10 counting circuits 411, 412, 413, 414, 415 and 416 which provide a maximum count of 9,999,999 eighteen bit words. It is to be understood, however, that for a greater or smaller count, a different number of decade counters 411 to 416 would be employed. The internal circuits of the counting circuit 411 indicated fragmentarily in FIG. 20 include four bistable valve circuits, 417, 418, 419 and 420 arranged to count 10 in binary fashion. These are the conventional cascaded type each with presetting connections. For the unit 411 presetting connections are provided, represented schematically by a line 422. There is an input connection 423 from the second channel output connection 406 of the tape play back package 401.

Each bistable circuit has an output connected to the input of the next bistable circuit such as the connection 424 between bistable circuits 417 and 418, the connection 425 between the bistable circuits 418 and 419 and the connection 426 between the bistable circuits 419 and 420. There is an output connection 427 from the decade circuit 411 serving as the input connection to the decade circuit 412. Similarly there are other connections 428, 429, 430, 431 and 432 successively, between the series of decade counters 412–416 inclusive.

Record starting and stopping control lines 433 and 434 are provided which are controlled by a bistable circuit 435 having an input or tripping connection 436 from the output of the final decade counter circuit 416. Preferably, amplifiers of suitable type such as thyratron amplifiers 437 and 438 are interposed between the signal output terminals of the valves of the bistable valve circuit 435 and the record stop and start lines 433 and 434.

For setting in the rerecording start time, schematically represented multipoint preset switches 441, 442, 443, 444, 445, 446 and 447 are provided which are connected to counter cables 422, 451, 452, 453, 454, 455 and 456 for the requisite presetting switch connections.

Preferably diodes 457, 458, 459, 460, 461, 462 and 463 are connected in series with the switches 441–447, respectively, to a common line 465 which is connected to the output of a thyratron pulse generator 466. There is a manual push button preset switch 467 for firing the thyratron 466 to preset the counter through the line 465. A line 448 is also connected to the switch 467 for resetting valve 449 of the bistable unit 435.

For presetting the elapsed time, preset switches 471 to 477, inclusive, are provided with interposed diodes 481 to 487, respectively.

The switches 441–447 and 471–477 are arranged and connected in the manner described by Paul Bey in Tele-Tech, July 1955, pages 72–73 in an article entitled "Time and Frequency Measurements with a New Preset Counter." The switches 441–447 are set for a value such that the last bistable circuit of the counter will trip at the desired start time, whereas the switches 471–477 are set to cause the supply of data to stop after the desired "time slice" of data has been supplied to the units 153 and 154 (FIG. 13) by block generator 404 or by the play back package 401.

A common line 478 of the diodes 471–477 is connected through a line 479 to the output of the thyratron amplifier 437 for causing the starting pulse supplied by the bistable circuit 435 to reset the counter for elapsed time according to the settings of switches 471–477.

Figure 21:
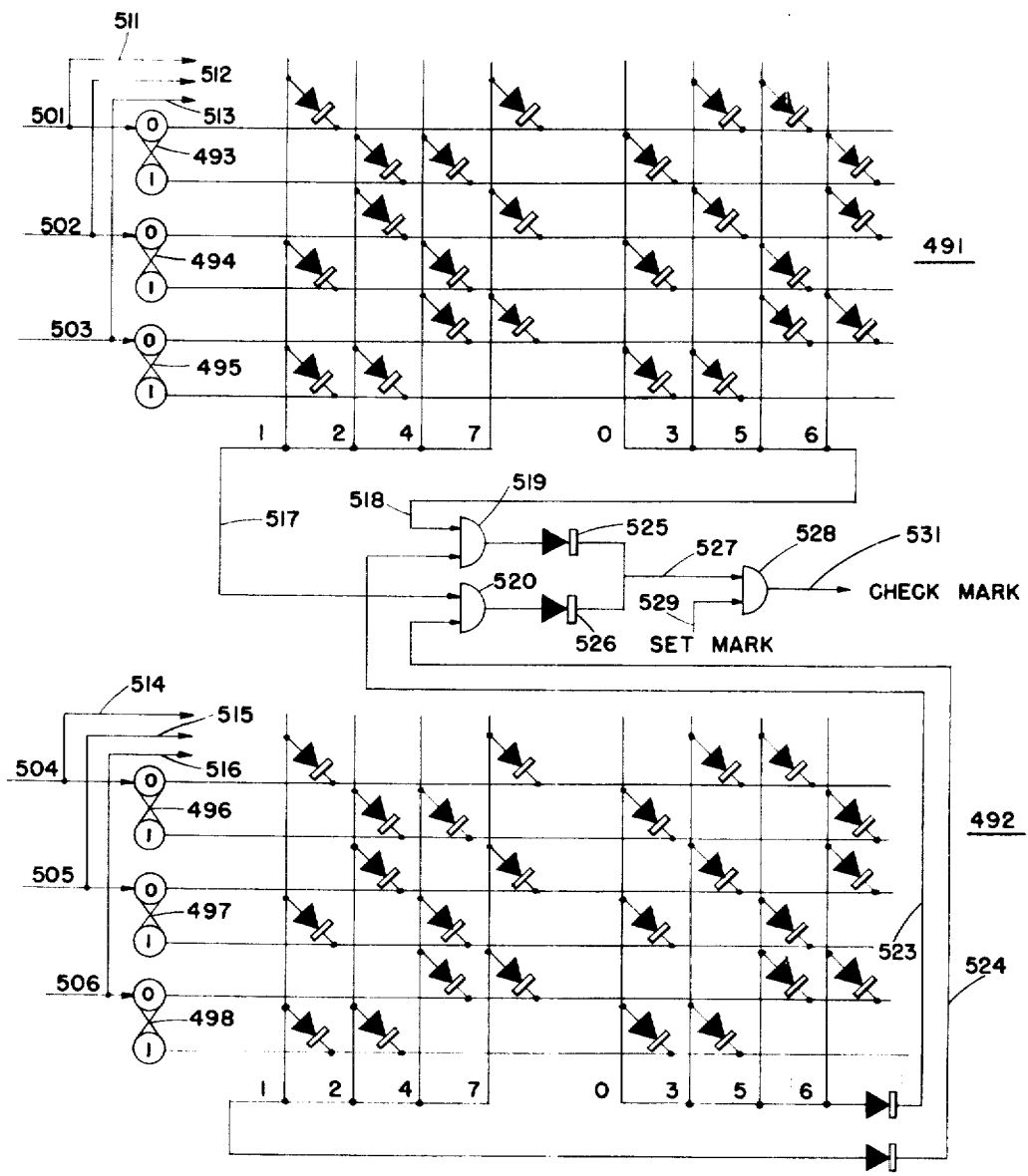
FIG. 21 is a schematic diagram of a lateral parity check mark generator.

The redundancy generator 402 (FIG. 13) constitutes a lateral parity check mark generator as shown in FIG. 21. It comprises two logical matrices, 491 and 492, each with three bistable valve circuits. The matrix 491 is provided with bistable valve circuits 493, 494, 495 and the matrix 492 with bistable circuits 496, 497 and 498. As shown the bistable circuits 493 to 498 inclusive, have input channels 501 to 506, respectively, with parallel connections 511 to 516, respectively.

Matrix 491 has two output conductors 517 and 518 connected to coincidence gates 519, 520, respectively. Matrix 492 likewise has two output connections 523 and 524 also connected as inputs to the coincidence gates 519 and 520 which in turn have output connections through diodes 525 and 526 to the input line 527 of a coincidence gate 528 with a second input line 529 and an output line 531 from which a check mark appears supplied as a timing pulse from the first track of the tape.

The redundancy generator is utilized in order that there will be an odd number of bits across the channels of the units 153 and 154. This arrangement is employed because when the computer 14 takes the form of IBM EDPM apparatus the timing depends on the presence of such a condition. Since in the binary code employed lack of magnetization of the tape represents one of the two digits, it is necessary to guard against a possibility that all the digits of the code will be those represented by lack of magnetization which would leave no magnetized point on the tape for timing.

To provide for blocking of the data supplied to the computer 14, a logical chassis is provided in the play back circuitry forming the record or block length generator or word-blocking generator 404. This is illustrated schematically in FIG. 22. There are data input channels two of which are represented by lines 405a, 405b and a timer channel 407 constituting output channels of the tape play back package 401 represented schematically in FIG. 13.

One output channel 408 comprises first to seventh bit output lines represented by tracks 541 and 542 whereas a second output channel 409 comprises first to seventh bit output lines represented by tracks 543 and 544.

The input channel 407 serves as a timing track.

The channel 408 serves as an odd block output channel and comprises coincidence gates 545 and 546 coupled to the output lines 541 and 542 through bistable valve units 547 and 548 and cathode follower circuits 549 and 550, respectively. The coincidence gate 545 has an output connection 553 to the bistable unit 547 and the coincidence gate 546 has an output connection 554 to the bistable unit 548. The coincidence gate 545 has input connections from the channel 405b and an input terminal 555; likewise the coincidence gate 546 has input connections from the channel 405a and an input terminal 556. Terminals 555 and 556 are connected together and to a channel 557 from the output terminal 558 of a bistable valve unit 559 coupled to the timing track 406 in a manner which will be explained later.

For the even block channel 409 there are coincidence gates 563 and 564 with corresponding output stages represented by bistable valve units 565 and 566 and cathode followers 567 and 568, respectively. The coincidence gate 563 has inputs 562 and 560; the coincidence gate 564 has an input 571 connected to a line 572 common to the input 569 connected to an output terminal of a bistable valve circuit 573, which is also coupled to the timing track apparatus.

Associated with the timing track are bistable valve units 573 and 574 with cathode followers 575 and 576 interposed in the output circuits thereof.

A preset counter 577 is provided, with an electronic alternator or switch 578 interposed between the counter 577 and input terminals 579 and 580 of the bistable valve units 573 and 574, respectively.

To guard against the valve circuits 573 and 574 being energized simultaneously with the timing pulses, 5 microsecond delay units 583 and 584 are provided with input channels 585 and 586 from the electronic switch 578, bistable valve units 573 and 574 serving as output channels. Delay units 583 and 584 are of the same magnitude. Preferably a delay unit 587 of twice the magnitude, for example, a 10 microsecond delay line, is interposed between the timing track 406 and the preset counter 577. A coincidence gate 588 is provided having a pair of input terminals 589 and 590 and an output terminal 592 connected to the preset counter 577. Line 590 is connected to the time filter 403 through the push button switch 467.

Referring to FIG. 21, for utilization in the computer apparatus 14 of the IBM EDPM type, the tape record provided by the play back unit 12 utilizes a lateral parity check mark. In binary code this signifies that there always be an odd number of bits across the seven computer input channels, six of which are data and the seventh the parity check mark channel. This is accomplished in the lateral parity check mark generator or redundancy generator illustrated in FIG. 21.

The two diode matrices 491 and 492 serve for examining two sets of three bits simultaneously received through the group of channels 501, 502, 503 and the group 504, 505, 506, thereby looking at all six bits at once. Each matrix emits a pulse when there is an odd number of bits presented to it. The two pulses are appropriately gated through the coincidence gates 519 and 520 so that two groups of odd numbers of bits (which means an even number of bits) and two groups of even number of bits generate a parity mark in the seventh channel represented by the output line 531. An odd from one matrix and an even from another (no pulse) represents an odd output and no parity mark is generated. This produces an odd number of bits across the seven channels as required, providing the lateral parity check mark.

Figure 22:
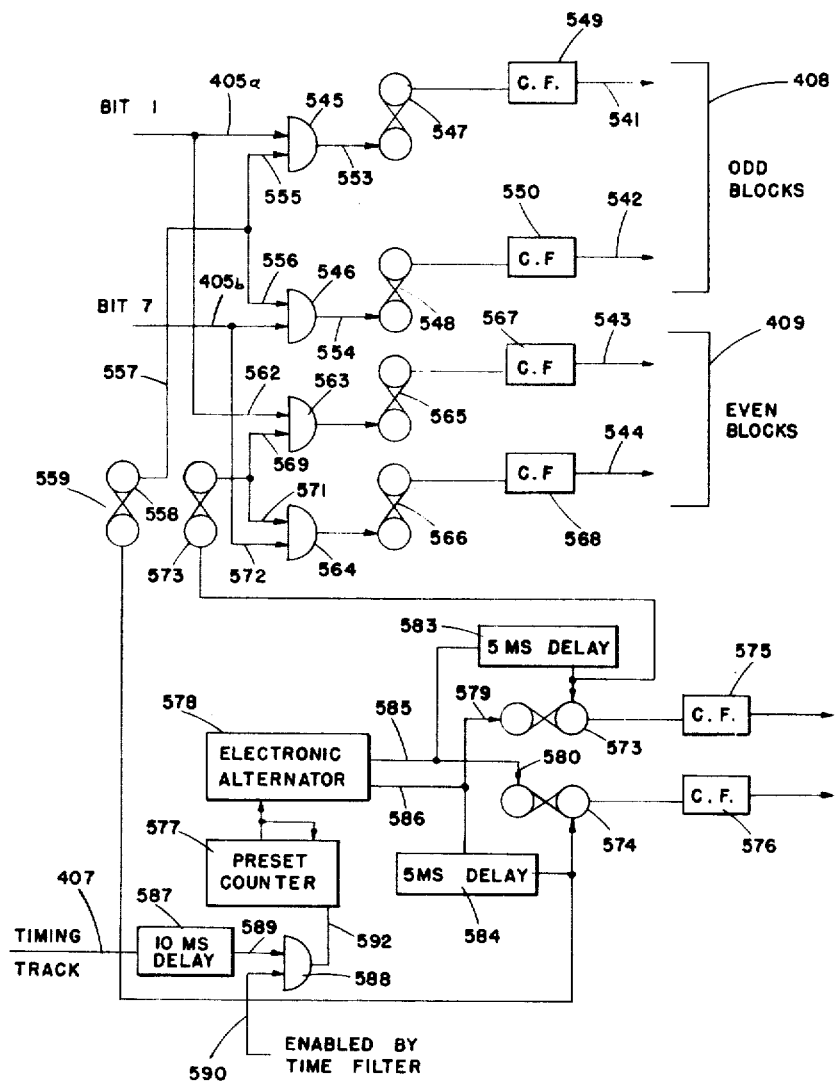
FIG. 22 is a schematic diagram of a block length generator.

Referring to FIG. 22, the circuitry illustrated alternately turns on and off each of the two computer units 14 illustrated in FIG. 13, supplying all of the odd blocks to one computer with a gap inserted between each block and all of the even blocks on a second computer. This is accomplished by presetting the block length chosen in the decimal setting switches of FIG. 20. By means of the apparatus illustrated, as many as 33,333 words can be placed in a block and as few as one hundred. The presetting is pulsed into the counters which start counting timing marks only during the time slice desired. As a result of time delay provided by the counter 577 unit the timing marks are delivered in anticipation of the corresponding data allowing the tape recorder to start and come up to speed before data recording begins. Five microsecond delay is inserted at the end of each block by units 583 and 584 to keep the tape recorder running and recording at the end of the block. At the same time the second tape recorder is turned on and it starts coming up to speed. After the completion of the 5 microsecond delay, the data are switched without loss of any bits from one tape recorder to the other and a gap has been inserted. It can be seen that in this operation all of the odd blocks will appear on one tape recorder and all of the even blocks on the second tape recorder. Alternatively, a single computer tape recorder can be used by first recording all of the odd blocks and then all of the even blocks.

The function of the recycling clamp 16 is illustrated in FIG. 4 of the drawing in which the instantaneous magnitudes of a continuously variable quantity are represented by a curve 601 and the magnitudes of another variable quantity are represented by a curve 602. Sampling portions of the curves 601 and 602 in successive time intervals, for example 100 microsecond increments of time, would result in composite curve having segments 603 and 604.

In order that the continuously varying analog quantities represented by the curve segments 603 and 604 may be converted to digital code, the values of the curve segments 603 and 604 at some predetermined point in the curve or the average value thereof are detected and held during the period when the digital code is being produced. For example, by the use of a recycling detector circuit of the type illustrated in FIG. 5, the initial value of the curve segment 603 is held for an increment of time, such as 100 microseconds as represented by the horizontal line 605 in FIG. 4 and the initial value of the curve 604 is held during the next 100 microseconds as represented by the horizontal line segment 606. It is to be understood that other analog quantities are detected in successive 100 microsecond time intervals.

Considering, for example, the variable quantity represented by the curve 601, a voltage corresponding thereto produced by an analog transducer having an output channel 25 (FIG. 1), is applied to the input terminal 607 of the recycling clamp 16 in response to the action of the multiplexer 15 under the control of the master timer 21.

Figure 5:
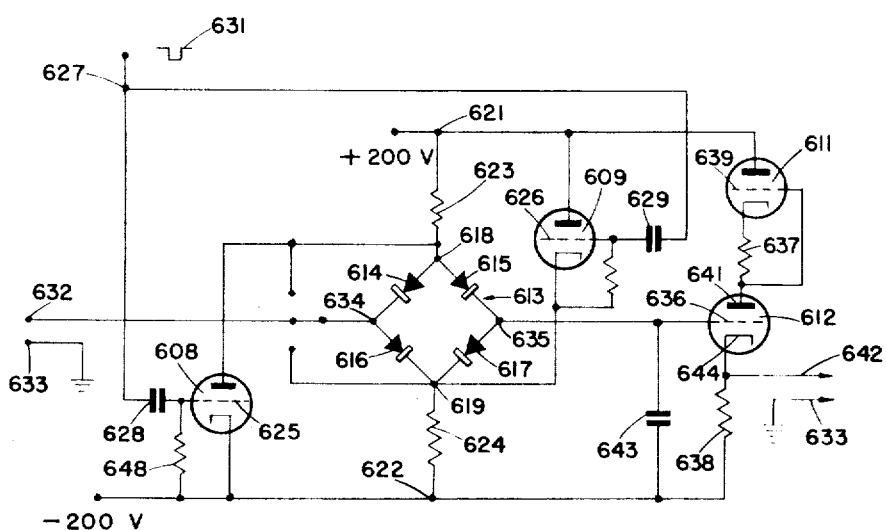
FIG. 5 is a circuit diagram of the clamping system employed for accomplishing the function described or illustrated in FIG. 4.

The circuit of FIG. 5 comprises a pair of switching tubes 608 and 609 shown as triodes which may constitute two halves of a twin triode tube, a cascode cathode follower comprising triode elements 611 and 612 which may be parts of a twin triode and a diode array 613 which may consist either of thermionic discharge elements or semiconductors, for example, silicon diodes. As shown, the diode array 613 comprises four diodes, 614, 615, 616 and 617 connected as a bridge with polarity such that positive current flows from a terminal 618 to a terminal 619. The terminals 618 and 619 are connected to a positive power supply terminal 621 and negative power supply terminal 622 through resistors 623 and 624, respectively.

The switching tube 608 is connected between the terminals 618 and 622 so as to bypass the diode array 613 and the diode resistor 624; whereas the switching tube 609 is connected between the terminals 621 and 619 so as to bypass the diode resistor 623 and the diode array 613. The switching tubes 608 and 609 have control electrodes or grids 625 and 626, respectively. The control elements 625 and 626 are coupled to a gate terminal 627 through coupling condensers 628 and 629. The master timer 21 is arranged to supply a negative trigger pulse 631 to the gating terminal 627 once for each cycle of the time 21.

Input terminals 632 and 633 are provided at which analog input signals from the multiplexer 15 are supplied. As shown, the analog input terminal 633 is grounded and the clamp input terminal 632 is connected to the diode array 613. For example, where a four-diode bridge array is employed, the terminal 632 may be connected to junction terminal 634 of the diode array 613. In this arrangement, a second diode array junction terminal 635 is connected to a control electrode 636 of the cascode cathode follower tube 612.

In the cascode cathode follower, the tubes 611 and 612 are connected in series between the positive power supply terminal 621 and the negative power supply terminal 622. There is a cathode resistor 637 connected in the cathode line of the tube 611 to the anode line of the tube 612, and the tube 612 is provided with a cathode resistor 638. The tube 611 has a control electrode 639 connected to the anode 641 of the tube 612 for stabilizing the tube 611. An output terminal 642 is connected to the cathode 644 of the tube 612 and the ground terminal 633 serves as a second output terminal.

The cathode follower tubes 611 and 612 provide a high degree of stability by reason of the feedback employed.

The clamping circuit of FIG. 5 operates in the following manner: When there is no signal applied to the input terminals 632 and 633, the switching tubes 608 and 609 are heavily conducting, pulling the potential of the diode array terminal 618 well below that of the diode array terminal 619. Consequently, the diodes 614 to 617 are cut off and a charge upon a storage condenser 643 is isolated. Since the charge upon the condenser 643 controls the potential of the cascode cathode follower control electrode 636 it determines the voltage output at the terminals 642 and 633.

However, when a brief strong negative pulse 631 is applied to the grids 625 and 626 of the switching tubes 608 and 609, they are cut off and rendered nonconducting. The voltage at this time is determined by the voltage drops across the resistors 623 and 624, and the diodes 614 to 617, which have become conducting; and the voltage is also modified by the analog signal at the input terminal 632 which is connected to the junction 634 of the diode array 613. Consequently, the voltage at the junction terminal 635 and therefore at the output terminal 642 will rise and fall with the input signal.

Figure 6:
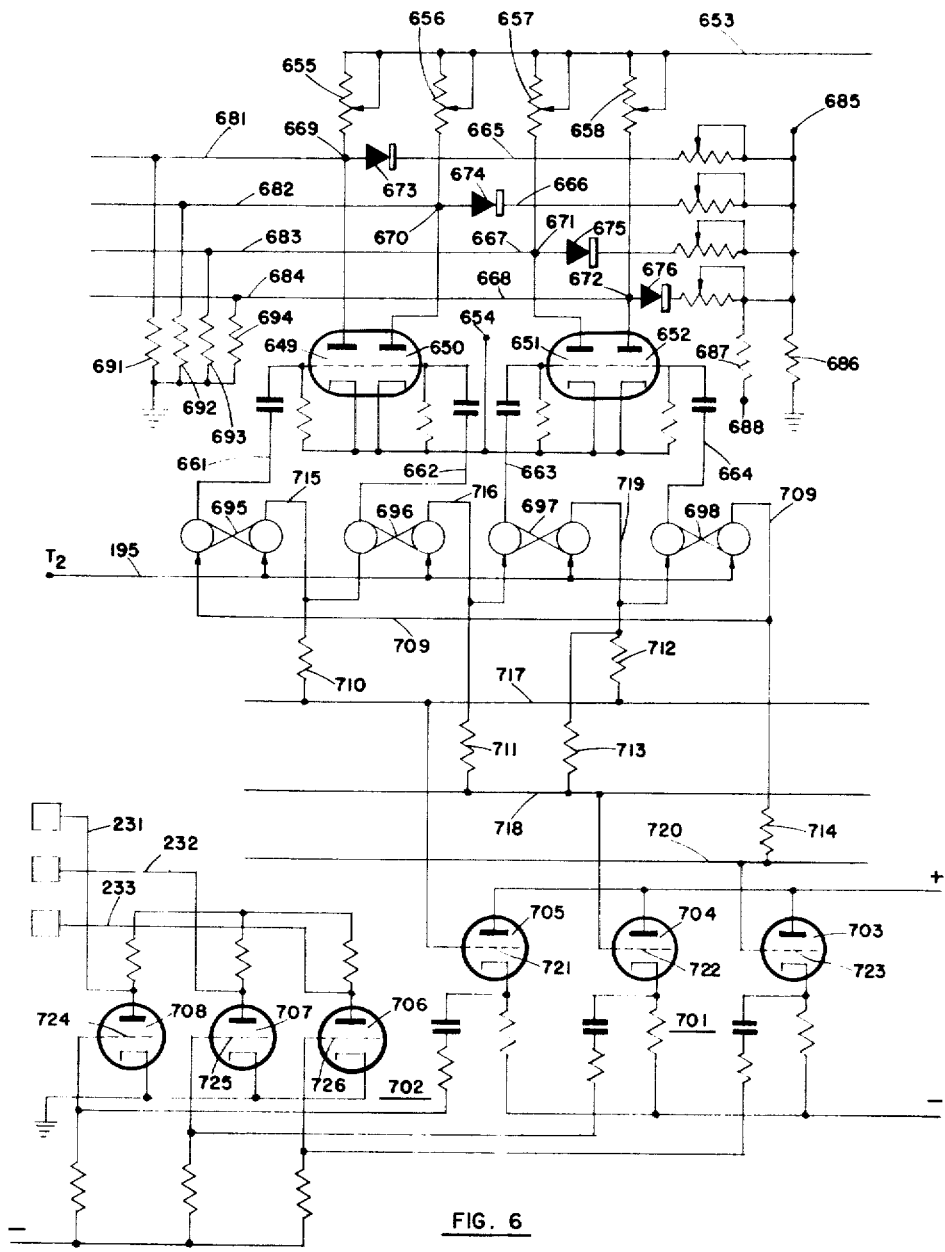
FIG. 6 is a circuit diagram of the multiplexer employed.

Silicon diodes are utilized in the clamping circuit of FIG. 5 and also in the multiplexing circuit illustrated in FIG. 6 for obtaining high temperature stability and utilizing the 100 megohm or higher back resistance of the silicon semiconductor.

Figure 25:
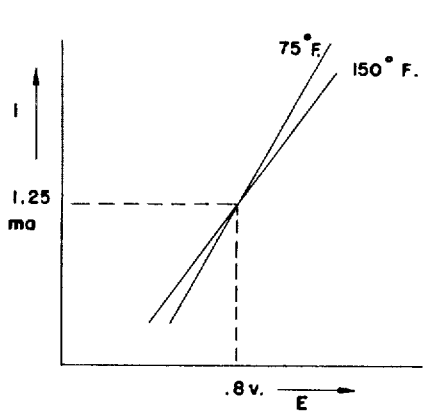
FIG. 25 is a graph illustrating the principle of operation of biased temperature compensated silicon diodes in the clamp and multiplexer of FIGS. 5 and 6.

FIG. 25 illustrates the conduction properties of a silicon diode, such as that sold under the type designation 1N 214, at different currents and at two temperatures. As conduction current nears zero, the resistance rises very rapidly. Also it may be shown that there is a conduction current, about 1.25 milliamperes, for which there is no change of resistance when the diode temperature varies. This conduction current associated with the temperature crossover is the preferred operating current in the low level switching circuits illustrated herein, wherein silicon diodes are employed such as the multiplexer of FIG. 6 or the clamp of FIG. 5. In the circuits illustrated the diodes are biased to give high accuracy at low input levels and the control vacuum tubes are connected in advance of diode input terminals to render the circuits independent of vacuum tube impedance characteristics.

Figure 26:
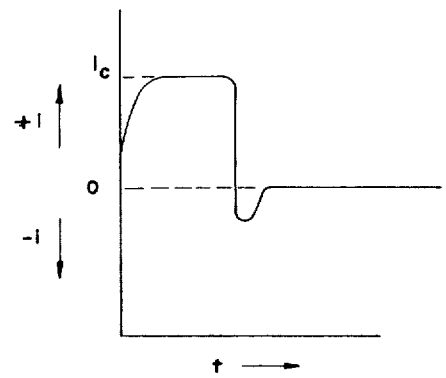
FIG. 26 is another graph illustrating the operation of the silicon diodes.

FIG. 26 illustrates the characteristics of such a diode when it is first pulsed in a positive direction and then in a negative direction. A certain length of time termed "rise time" is required until the final conduction current $i_c$ is attained. When the diode is then pulsed in the negative direction, the fall time is very rapid. Current carriers are left over from the conduction cycle and negative current passes until all of these carriers are cleaned out. The diode type and the circuit constants selected are such as to obtain rise time and recovery time as short as one microsecond.

Improved accuracy and reliability are obtained because the switching circuits utilizing the silicon diode as illustrated in FIG. 6, for example, cause the circuit to be switched on the input side of the diode instead of the output side thereof. Consequently the diode conducts only when the vacuum tube or electronic control valve is nonconducting. This eliminates vacuum tube noise and drift, whereas otherwise vacuum tube drift and noise would affect the output. As explained, the circuit forward biases the diode owing to the phenomena known as temperature desensitization, which largely eliminates diode drift. However, the circuit is biased for optimum diode recovery time for high speed switching. As a result drift is limited to 100 microvolts or less as distinguished from a drift of 20 millivolts, which tends to occur with vacuum tube switching.

Figure 14:
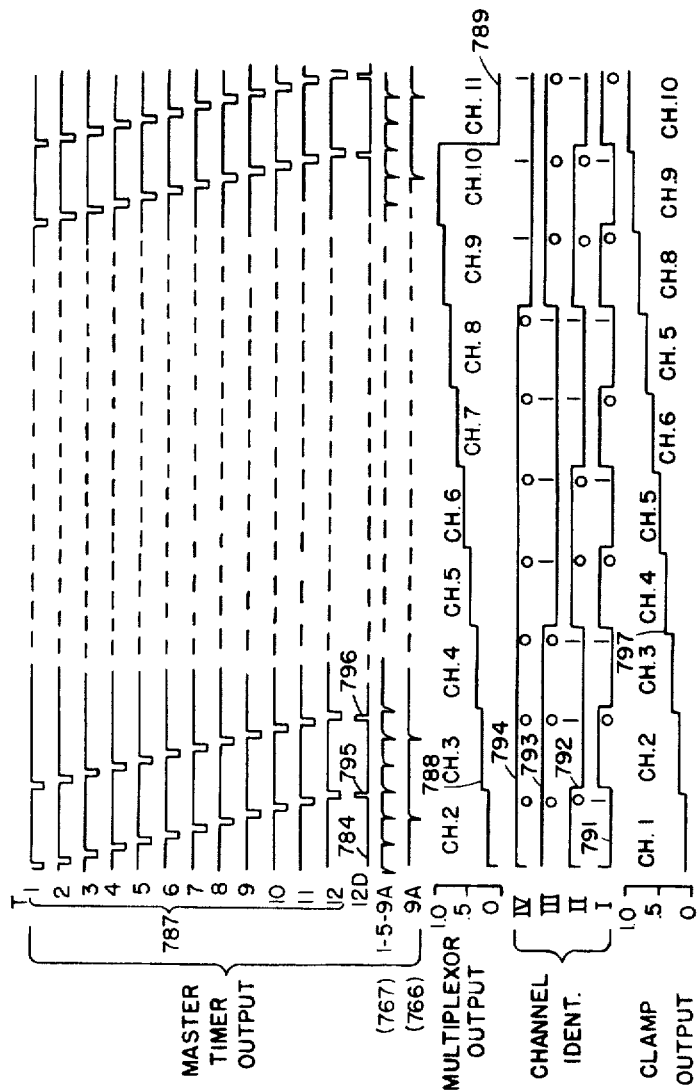
FIG. 14 is a graph illustrating the output voltages of the master timer employed in the apparatus of FIG. 2 for applying synchronous signals to the circuit of FIG. 10 together with output voltages of certain synchronized elements.
Figure 15:
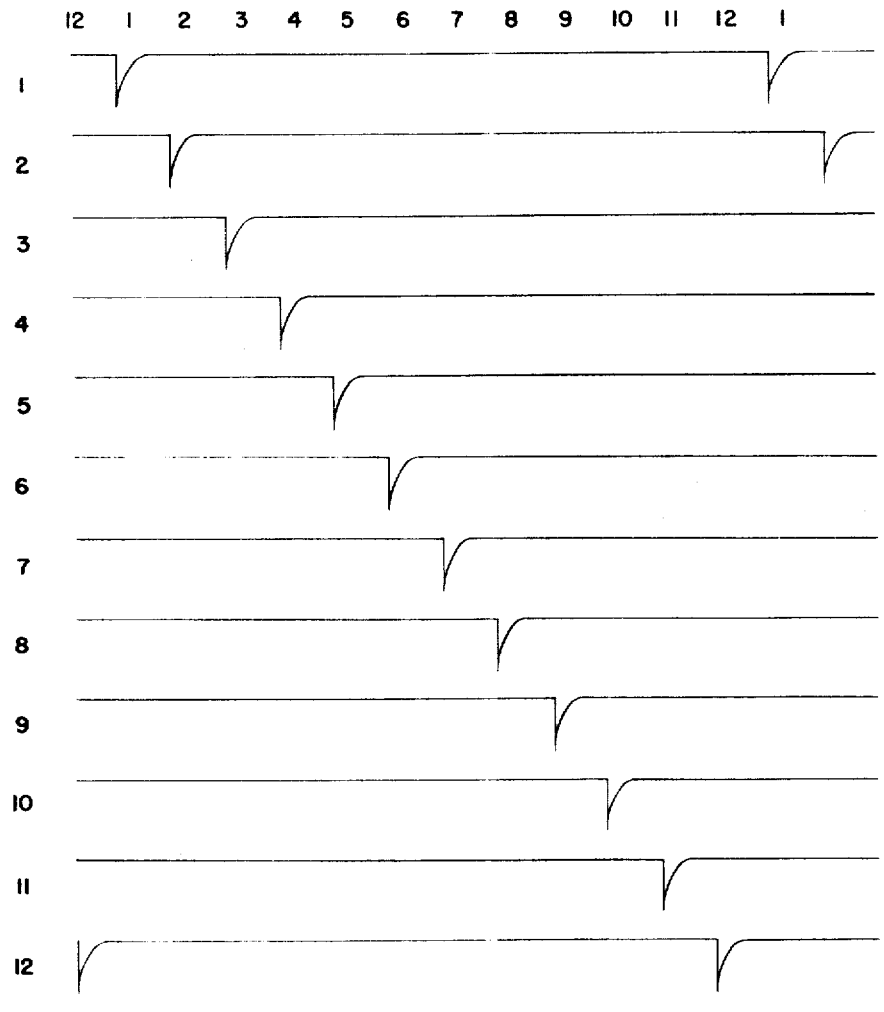
FIG. 15 is a graph illustrating the form of the voltages of FIG. 14 after being passed through the pulse shaper units of the apparatus of FIG. 10.
Figure 24:
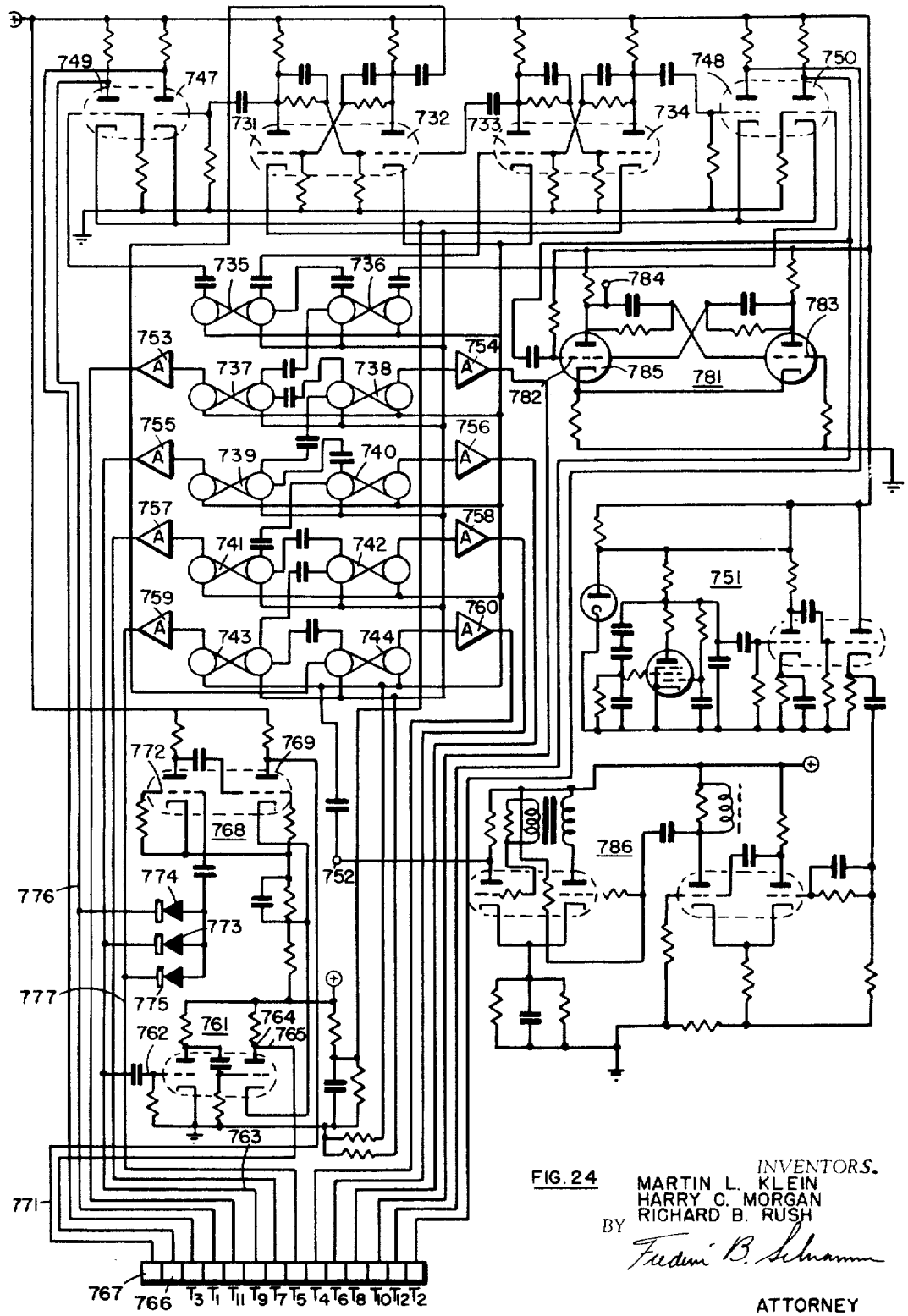
FIG. 24 is a circuit diagram of the master timer.

The multiplexer 15 may be of the diode switch type, such as is illustrated, for example, in FIG. 6. For simplicity, only sufficient circuit elements for four channels are shown in FIG. 6; but the principle of operation will be apparent from the explanation of four-channel operation. The multiplexer, as shown, comprises a plurality of thermionic valve units such as triodes 649, 650, 651 and 652 controlling four channels by means of a matrix of silicon diodes. Preferably, diodes of the 1N 214 type are employed. The triodes 649–652 are energized by means of a power supply having a positive terminal 653 and a negative terminal 654, adjustable anode resistors 655, 656, 657 and 658 being interposed between the positive terminal 653 and the anodes of the triodes 649–652. The triodes 649–652 have control electrodes capacitatively coupled to control terminals 661, 662, 663 and 664, respectively, which are connected through bistable valve circuits 695–698 of the Eccles-Jordan trigger type, for example, to successive output terminals of the master timer 21 at which appear successive negative pulses such as illustrated in FIG. 14. The master timer 21 may comprise a ring counter of the type described, for example, in "High Speed Computing Devices," 1950, by Engineering Research Associates, pages 23–25, and illustrated in FIGS. 3–7 thereof, or described in "Electron Tube Circuits" by Samuel Seely, 1950, pages 422–424, and illustrated in FIGS. 19–20 thereof. Preferably, however, a circuit as illustrated in FIG. 24 is employed.

The diode matrix of FIG. 6 includes a lattice formed by plurality of transverse conductors 665, 666, 667 and 668, each having a connection to a different one of the anode leads of the triodes 649–652 so that the connections serve as anode terminals 669, 670, 671 and 672. Semiconductor diodes 673, 674, 675 and 676 are provided which are so connected in series with conductors 665, 666, 667 and 668, respectively, that the triode anode terminals 669–672 serve also as anode terminals for the diodes 673–676.

Input terminals 681, 682, 683 and 684, to which successively different analog signals are supplied, are connected to the conductors 665–668 at the anode ends of the diodes 673–676. The opposite ends of the conductors 665–668 are connected to an output terminal 685, which is grounded through a resistor 686 and negatively biased through a resistor 687 connected to a negative bias supply terminal 688 which may be common to the terminal 654. The analog signal input terminals 681–684 are also grounded through separate bleeding resistors 691–694.

The apparatus is arranged for a channel identification code to be produced by the multiplexer 15 illustrated in FIGS. 2 and 6 and supplied to the transcriber 19, the circuits of which are illustrated in FIG. 11. To this end, the timing pulses for excitation of the control terminals 661, 662, 663 and 664 are supplied through bistable valve circuits 695, 696, 697 and 698 and are read out through cathode followers 701 followed by amplifiers 702.

For simplicity only four analog signal channels have been represented in FIG. 6, and only four of the channel identification bistable valve units of FIG. 11 have been represented in FIG. 6. Accordingly, only three cathode follower tubes 703, 704 and 705 have been illustrated and only three triode amplifiers 706, 707 and 708 have been shown in FIG. 6. It is to be understood, however, that for identification of a greater number of channels, for example, up to 256 analog channels, the eight bistable valve circuits I to VIII, inclusive, represented in FIG. 11 would be utilized in the multiplexer in FIG. 6 and the correspondingly greater number of amplifying channels in the cathode follower group 701 and cathode follower group 702 would be employed with the corresponding additional circuit connections.

In the arrangement as illustrated for simplicity in FIG. 6 each of the bistable valve units 695, 696, 697 and 698 has a synchronizing input connection through a line 195 from the terminal T1 of the timer 21 thereby synchronizing the multiplexer 15 with the analog to digital converter 18 illustrated in FIG. 10. The bistable valve circuits 695, 696, 697 and 698 are arranged in ring form, as shown by a feedback connection 709 from one of the tubes of the unit 698 back to input terminal of one of the tubes of the unit 695. Accordingly, for each timing cycle of the master timer 21, the ring of bistable valve circuits 695, 696, 697 and 698 is advanced one step and a different one of the analog input channels 681, 682, 683 and 684 is connected to the output terminal 685 of the multiplexer.

For reading out the setting of the bistable valve units 695, 696, 697 and 698 in the binary code, the amplification stages 701–702 are connected to output terminals of the bistable valve units through a resistor matrix comprising resistors 710, 711, 712, 713 and 714. Resistors 710 and 711 are connected from lines 715 and 716 of the bistable valve units 695 and 696 to matrix conductors 717 and 718, respectively. Resistors 712 and 713 are connected from an output terminal of the bistable valve unit 697 through a conductor 719 to matrix conductors 717 and 718, respectively. The resistor 714 is connected from the output conductor 709 of the bistable valve unit 698 to a third matrix conductor 720. The matrix conductors 717, 719 and 720 are connected to control grids 721, 722 and 723 of cathode follower tubes 705, 704 and 703, respectively. The outputs of these tubes are in turn capacitatively coupled to control grids 724, 725 and 726 of the triode amplifiers 708, 707 and 706, respectively. The anode output terminals of the tubes 708, 707 and 706 are connected to the conductors 231, 232 and 233 constituting input conductors of channel identification channels I, II, III of the tape code transcriber 19, the circuits of which are illustrated schematically in FIG. 11.

In operation of the apparatus, all but one of the diodes 673–676, inclusive, is rendered inoperative by lowering its anode potential sufficiently so that it falls below ground potential and the diode becomes nonconducting. This is accomplished by the fact that the control terminals 661–664 of the triodes 649–652 are normally at ground potential causing the triodes 649–652 to remain conducting, thereby reducing the anode potential. However, as the negative pulses illustrated in FIG. 14 appear in sequence upon the control terminals 661–664, the triodes sequentially become nonconducting so that one of the anode terminals at a time, rises in potential and permits the corresponding diode to become conducting, thereby causing the corresponding input signal to transmit its signal to the output terminal 685.

For example, when the diodes 674, 675 and 676 are nonconducting and the diode 673 is conducting, the diode 673 is biased by the passage of current through the anode resistor 655, the diode 673, the conductor 665 and the resistor 686 to ground. The potential of the cathode of the diode 673 and therefore the potential of the output terminal 685 is determined by the potential of the input signal appearing upon the input terminal 681. Any rise or fall in the potential of the signal would cause such a differential of current through the resistors 655, 691 and 686 as to cause the potential of the output terminal 685 to correspond to the potential of the analog signal input terminal 681.

The internal circuits of the master timer 21 are illustrated in FIG. 24. A ring of twelve bistable valve units is employed to produce twelve equally spaced time pulses for each timing cycle. The internal circuits of the first pair of bistable valve units are illustrated in FIG. 24 comprising a pair of triodes 731 and 732 and a pair of triodes 733 and 734. The remaining bistable valve units having the same internal circuits are represented schematically by conventional bistable valve unit symbols 735, 736, 737, 738, 739, 740, 741, 742, 743 and 744. For amplifying the output pulses of the valves 731 and 734, isolating the output terminals and inverting the pulses, amplifiers are provided which may take the form of triode elements 747 and 748. Isolating amplifiers 749 and 750 are provided for the bistable valve units 735 and 736, respectively.

For stabilizing the master timer and accurately fixing the output pulse frequency a crystal clock 751 is provided having an output terminal 752 coupled to tripping terminals of the units 731–744, inclusive. Amplifiers 749 and 750 serve the bistable valve units 735 and 736, respectively. Likewise schematically represented amplifiers 753–760, inclusive, serve the bistable valve units 737–744, inclusive. Each of the amplifiers has a separate output terminal in the group numbered $T_1$–$T_{12}$, inclusive. They are numbered to represent the order in which negative pulses appear at such timer terminals. For example, the terminal $T_1$ is connected to the output of the amplifier 749 and the terminal $T_2$ is connected to the output of the amplifier 748 which respond to the bistable valve units 735 and 734, respectively. The arrangement is such that negative pulses appear in succession on the timer output terminals $T_1$–$T_{12}$, inclusive.

In order to provide a separate timing pulse, once for each timing cycle in the timing channel or track of the tape 13 which shall be independent of voltage effects at the timer terminals $T_1$–$T_{12}$, inclusive, an isolating amplifier 761 is provided having an input or control terminal 762 coupled to a line 763 connected to the output terminal $T_9$ and having an output terminal 764 connected by a line 765 to an output terminal 766.

Terminal 766 provides pulses in every third row of marks in the tape 13 for the "word" timing. In order to provide three marks for each timer cycle, that is a timer mark for each successive row of the tape 13, an output terminal 767 is provided which is coupled to three of the bistable valve units of the group 731–744, inclusive. This is accomplished through an isolating amplifier 768 having an output terminal 769 connected to a line 771 to the terminal 767. The amplifier 768 has an input control grid terminal 772 capacitatively coupled to the line 763 through a rectifier 773. The terminal 772 is also coupled through rectifiers 774 and 775 to lines 776 and 777, respectively. The line 776 is connected to the output of the amplifier 749 serving the bistable valve unit 735, whereas the line 777 is coupled to the amplifier 759 serving the bistable valve unit 743. As previously explained, the line 763 is connected to the output of the bistable valve unit 739. In this way timer pulses appear on the terminal 767 during the first, fifth and ninth periods of each timer cycle.

In order to provide a time pulse corresponding to the pulse appearing on the terminal $T_{12}$ but slightly delayed, a delay unit 781 is provided. It comprises a single-oscillation, biased multivibrator having an input control grid 782 coupled to the output of the amplifier 750 serving the bistable valve unit 734 which supplies the twelfth timer pulse at the terminal $T_{12}$. The multivibrator 781 is arranged for single oscillation by biasing its control grid 782 positively, whereas negative bias is provided for a second control grid 783. A terminal 784 is provided at which a pulse appears which is delay with respect to that of the terminal $T_{12}$. The terminal 784 is connected to the anode of the tube 785 having the input control grid 782.

Preferably the master clock 751 is provided with a stabilized amplifier 786 having negative feedback for stabilization.

The sequence of operations produced by master timer 21 is illustrated in the graphs of FIGS. 14 and 27. For the purpose of illustration it is assumed that the multiplexer 15 is a 10-channel multiplexer and that the inputs to the ten channels are ten different successively higher static voltages. From the group of curves 787 it will be observed that at the twelve different output terminals $T_2$–$T_{12}$, inclusive, negative square wave pulses are produced as represented by curves identified by the same reference numbers, $T_1$–$T_{12}$, inclusive. The delayed pulse from the terminal 784 of the master timer illustrated in FIG. 24 is identified as curve $T_{12}D$.

From the curves $T_1$–$T_{12}$, inclusive, it will be observed that the negative pulses are distributed at intervals forming twelve successive time periods within a timing cycle. Since a 10-channel multiplexer is assumed, ten successive timing cycles are illustrated in the curves of FIGS. 14 and 27. In connection with the production of a digital code, each timing cycle is divided into twelve timing intervals, but one time cycle is consumed for the conversion of each analog value into a digital code representation thereof and for the recordation of such encoded value upon the tape 13.

As illustrated by the group of curves 787 of FIG. 14, the negative pulse of the curve at the terminal $T_{12}D$ is delayed by a half interval or 1/24 of the timing cycle. However, three sharp negative pulses or time marks are produced at the timer terminal 767 for each timer cycle and a single word marker is produced at the terminal 766 for each timer cycle. The negative excursions of the voltage wave at the terminal 767 correspond to the negative excursions of the curves at the terminals $T_1$, $T_5$ and $T_9$ whereas the negative excursion of the curve of the voltage wave at the terminal 766 corresponds to that at the timer terminal $T_9$.

Since it has been assumed for the purpose of illustration that the analog signals to be encoded are of successively higher values, the output wave form of the multiplexer 15 is represented by a curve 788 having a series of successively higher plateaus each corresponding in length to the length of a single cycle of the timer 21. The arrangement is such that the voltage received from the first channel at the portion 789 of the curve form at the righthand end of curve 788 is fed through the multiplexer at the negative excursion of the tenth cycle of the timer wave at the terminal $T_2$.

For a 10-channel multiplexer a divide-by-10 circuit is employed so that at each timer cycle a successively different analog input source is connected to the multiplexer output to produce the ten different levels of the curve 788. Since only four channels are illustrated for simplicity in FIG. 6 only the initial portion of the divide-by-10 circuit is shown in FIG. 6, consisting of bistable valve units 695, 696, 697 and 698 and only three channel identification terminals 231–233 are shown in FIG. 6. At these three terminals a channel identification code appears in the voltages represented by the curves 791, 792 and 793. If the remaining stages of the multiplexer channel identification circuit where shown in FIG. 6, a fourth terminal would be shown at which a voltage wave 794 would appear.

Since the instant of negative excursion of the voltage at terminal 784 or curve $T_{12}D$ is the reading time for the apparatus it will be observed that the curves 791 and 794 produce a binary code representing the channel. The negative excursion of curves 791–4 represents the digit one and the positive excursion represents the digit zero. At the instant 795 determined by the curve $T_{12}D$, the binary value of the channel identification is 0001 which represents channel one in the decimal numeration. At the next reading time 796 the binary representation of the channel identification code is 0010 which corresponds to decimal two to identify channel II. So on for successive reading times, the binary channel identifications are 0011 (decimal III), 0100 (decimal IV), 0101 (decimal V) and so on.

Owing to the fact that it was assumed that the analog input values were static voltages, the output voltages during the successive time cycles from the clamp 16 as shown by the curve 797 correspond in form to the curve 788. However, each new level of clamped voltages, each portion of which is horizontal regardless of fluctuations at analog signal inputs, commences an interval earlier in each timer cycle owing to the fact, as shown in FIG. 2, the clamp 27 is synchronized from the terminal $T_1$ of the timer 21 instead of terminal $T_2$.

The group of curves 798 of FIG. 27 represents the output of the analog to digital converter 18 at the lines 221 to 230, inclusive, from the bistable valve units 41–50, inclusive, referring to FIGS. 10 and 11. Each curve of group 798 represents the output from a different one of the bistable valve units 41–50, inclusive. As previously explained, encoding of the bistable valve units in the analog to digital converter 18 depends upon the magnitudes of the successive analog signal inputs to be encoded. The readings in ten digit binary code are shown in the curves of the group 798 by the voltage levels as indicated by the digits zero and one shown at the successive reading points for successively different signal inputs in the ten successive cycles of the curve.

The tape code transcriber illustrated in FIG. 11 is illustrated as used in connection with multiplexer having sufficient bistable valve units to produce an eight digit binary location code. The voltage outputs of the bistable valve units, the first four of which 695–698, inclusive, are also shown in FIG. 6 serve as the channel location code. The channel-identification code inputs to the transcriber of FIG. 11 for four digits of the code are represented by curves 791 to 794 of FIG. 14.

Owing to the fact that the transcriber 19 as illustrated in FIG. 11 is arranged so as to produce data output in six different tracks, namely, the recorder tracks 3 to 8, inclusive, voltage waves in the group of curves 799 have negative peaks corresponding to the negative excursions of the group 798 selected according to the connections shown in FIG. 11. For example, in channel 8 readings are produced successively from the bistable valve units 273, 267 and 261 at pulses $T_1$, $T_5$ and $T_9$ of the curves 787. The units 273, 267 and 261 have previously been set by the outputs of the bistable valve unit 697, the data bistable valve unit 47, and the data bistable valve unit 41, when the delayed pulse appeared at terminal $T_{12}D$. Consequently the curve 801 of FIG. 27 representing the transcriber output for track 8 has negative excursions for each timer cycle corresponding to the readings of curves 791–794 and the group of curves 798.

Owing to the action of the resetting pulse from line 65 actuated by the terminal $T_1$ of the timer terminal as illustrated in FIG. 10, all of the bistable valve units of the analog to digital converter of FIG. 10 are restored to zero value after each timer cycle at the timer interval $T_1$ if not already at the zero value, as shown by group of curves 798.

The currents in the recording heads 347–354 of FIG. 12 are illustrated in group of curves 802 of FIG. 27. The curves 802—1 and 802—2 represent the timing marks and word marks respectively, and the current reversals correspond in time to negative excursions of the curves of the voltage waves at terminals 767 and 766 as illustrated in group of curves 767 in FIG. 14. On the other hand, the current reversals in the remaining six recording heads are represented by curves 802–3 to 802–8, respectively, and correspond to negative excursions of curves 799–3 to 799–8, respectively, of FIG. 27.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A data handler comprising the combination of a multiplexer for receiving analog signals from a plurality of channels, an amplifier responsive to the multiplexer, a clamping unit responsive to the amplifier for successively holding signal levels of analog signals supplied to successive channels of the multiplexer input, an analog to digital converter responsive to the clamping unit, said multiplexer producing identification code, a tape code transcriber for regrouping the multiplexer code together with the digital coding of the converter, a multi channel recorder responsive to the transcriber, a recorder tape handler responsive to the recorder with a master timer interlocked with the multiplexer for synchronizing the multiplexer, the clamping unit, the converter and the tape code transcriber.

2. A data handler comprising the combination of a multiplexer for receiving analog signals from a plurality of channels, an amplifier responsive to the multiplexer, a clamping unit responsive to the amplifier for successively holding signal levels of analog signals applied to successive channels of the multiplexer input, an analog to digital converter responsive to the clamping unit, said multiplexer producing an identification code, a tape code transcriber for forming the identification code and the digital coding of the converter into a number of sets of bits, a multi channel recorder responsive to the transcriber for recording the bits of each set in parallel and recording each set in series, a recorder tape handler responsive to the recorder with a master timer interlocked with the multiplexer synchronizing the multiplexer, the converter, the clamping unit and the tape code transcriber.

3. In a data handling system, a tape handler for record tape for carrying digital records in a plurality of channels, a tape play back unit, a block generator with a plurality of channels interconnecting the tape play back and the block generator for alternately presenting said digital records at different outputs of said block generator, a redundancy generator interposed in one of the channels, a cross coupling between another of the channels and the redundancy generator, a time filter interposed between still another of the channels and the block generator for counting records and enabling said block generator for a period having a duration and time of initiation determined by the counting of preselected numbers of records, and a plurality of tape recorders respectively responsive to the block generator outputs whereby data may be processed and recorded at a high rate of speed.

4. Apparatus for preparing analog data from a plurality of sources for digital computation in a computer comprising multiplexing and clamping means for sequentially producing fixed voltages momentarily retaining the instantaneous values of successively different analog data at successive instants, mean for converting each such voltage into a digital code signal while such voltage is momentarily retained, means for transcribing the code signals, means for recording the code signals, means for playing back the recorded signals to produce electrical signals in a plurality of channels, means for generating redundancy signals from selected channels, means for filtering signals from one of the channels with respect to time, and means for blocking the channels in conjoint response to the time filtered signals and redundancy signals for supplying successive digital signal groups to a computer.

5. Apparatus for preparing analog data from a plurality of sources for digital computation comprising means for momentarily retaining instantaneous values of successively different analog data in successive instants, means for sequentially producing fixed mutually discrete voltages each comprising the sum of a number of components decreasing in magnitude stepwise until corresponding in magnitude to the analog data, means for converting each such voltage into a digital code signal, means for transcribing the code signals means for converting the code signals into magnetic impulses and means for subjecting a magnetic tape to such impulses to record the signal for a permanent record and for immediate or subsequent computation.

6. Apparatus for preparing analog data from a plurality of sources for digital computation comprising means for sequentially producing fixed voltages momentarily retaining the instantaneous value of successively different analog data at successive instants, means for converting each such voltage into a digital code signal while such voltage is momentarily retained, transcribing the code signals, converting the signals into magnetic impulses and means for subjecting a magnetic tape to such impulses to record the signal.

7. Apparatus for preparing analog data from a plurality of sources for digital computation comprising a multiplexing and clamping means for sequentially producing fixed voltages momentarily retaining the instantaneous values of successively different analog data at successive instants, means for converting each such voltage into a digital code signal while each voltage is momentarily retained, means for transcribing the code signals, means for recording the impulses on tape, means for playing back the tape to produce electrical signals in a plurality of channels, means for filtering signals from one of the channels with respect to time and means for blocking the channels in response to time filtered signals for supply successive signal groups separately to computing apparatus.

8. Apparatus for preparing analog data from a plurality of sources for digital computation comprising means for sequentially producing voltages each temporarily clamped at the instantaneous values of successively different analog data at successive instants, means for converting each such voltage into a digital code signal while such voltage is temporarily clamped, and means for recording such signal.

9. A system for preparing analog data from a plurality of sources for digital computation comprising multiplexing and clamping means for sequentially producing fixed voltages momentarily retaining the instantaneous values of successively different analog data at successive instants, means for converting each such voltage into a digital code signal, while it is momentarily retained, means for impressing such code signals on a record tape, means for playing back the tape to produce electrical signals in the plurality of channels, means for filtering signals from one of the channels with respect to time, and means for blocking the channels in response to time filtered signals for supplying successive signal groups separately to computing apparatus.

10. A data handling system comprising a triggered multiplexor having an output signal sequentially representing analog data signals in each of a plurality of input channels and providing channel identifying signals, clamp means responsive to said multiplexor for temporarily storing the value of said multiplexor output, a cyclic timer for generating cyclically repetitive groups of timing pulses, each group including a plurality of clock pulses mutually spaced at intervals greater than the interval between consecutive timing pulses, means for triggering said multiplexor from a selected pulse of each group, means for actuating said clamp means from a pulse of each group occurring subsequent to said multiplexor triggering pulse, an analog to digital converter responsive to said clamp means and controlled by said timing pulses for converting said stored value to digital form data signals, a buffer storage device, means for transferring said channel identifying signals of said multiplexor and said digital form data signals of said analog to digital converter to said buffer storage device in response to a selected pulse from each timing pulse group, means responsive to said plurality of clock pulses for consecutively gating mutually distinct sets of signals from said buffer storage device, said sets collectively forming a word, a recorder responsive to said gating means and having a plurality of write heads each connected to receive one signal of each of said sets whereby said sets of signals from said buffer storage are consecutively recorded, said recorder including a first timing head responsive to each of said clock pulses to indicate each set and a second timing head responsive to one of said clock pulses to indicate each word, reading means for reading the clock pulses recorded by at least one of said timing heads and for reading said recorded sets of signals, first and second system output devices, first and second data selection gating means for respectively gating to said system output devices the sets of signals read by said reading means, block generating means for counting clock pulses read by said reading means and alternately operating said first and second data selection gating means for periods represented by preselected numbers of clock pulses whereby blocks of said sets of signals are alternately gated to said first and second system output devices, a time filter for counting clock pulses read by said reading means and enabling said block generating means during intervals represented by preselected numbers of counted pulses.

11. A data handling system comprising a triggered multiplexor having an output signal sequentially representing analog data signals in each of a plurality of input channels and providing channel identifying signals, clamp means responsive to said multiplexor for temporarily storing the value of said multiplexor output, a cyclic timer for generating cyclically repetitive groups of timing pulses, each group including a plurality of clock pulses mutually spaced at intervals greater than the interval between consecutive timing pulses, means for triggering said multiplexor from a selected pulse of each group, means for actuating said clamp means from a pulse of each group occurring subsequent to said multiplexor triggering pulse, an analog to digital converter responsive to said clamp means and controlled by said timing pulses for converting said stored value to digital form data signals, a buffer storage device, means for transferring said channel identifying signals of said multiplexor and said digital form data signals of said analog to digital converter to said buffer storage device in response to a selected pulse from each timing pulse groups, means responsive to said plurality of clock pulses for consecutively gating mutually distinct sets of signals from said buffer storage device, said sets collectively forming a word, a recorder responsive to said gating means and having a plurality of write heads each connected to receive one signal of each of said sets whereby said sets of signals from said buffer storage are consecutively recorded, said recorder including a first timing head responsive to each of said clock pulses to indicate each set and a second timing head responsive to one of said clock pulses to indicate each word.

12. A data handling system comprising a triggered multiplexor having an output signal sequentially representing analog data signals in each of a plurality of input channels and providing channel identifying signals, clamp means responsive to said multiplexor for temporarily storing the value of said multiplexor output, a cyclic timer for generating cyclically repetitive groups of timing pulses, each group including a plurality of clock pulses mutually spaced at intervals greater than the interval between consecutive timing pulses, means for triggering said multiplexor from a selected pulse of each group, means for actuating said clamp means from a pulse of each group occurring subsequent to said multiplexor triggering pulse, an analog to digital converter responsive to said clamp means and controlled by said timing pulses for converting said stored value to digital form data signals, a buffer storage device, means for transferring said channel identifying signals of said multiplexor and said digital form data signals of said analog to digital converter to said buffer storage device in response to a selected pulse from each timing pulse group, means responsive to said plurality of clock pulses for consecutively gating mutually distinct sets of signals from said buffer storage device, said sets collectively forming a word, recording means responsive to said buffer device, and playback means for selectively presenting data from said recording means under the control of clock pulses recorded in said recording means.

13. In a data handling system, a record having recorded thereon sets of data signals and timing pulses, reading means of reading said pulses and sets of data signals, first and second system output devices, first and second data selection gating means for respectively gating to said system output devices the sets of signals read by said reading means, block generating means for counting timing pulses read by said reading means and alternately operating said first and second data selection gating means for periods represented by preselected numbers of timing pulses whereby blocks of said sets of signals are alternately gated to said first and second system output devices, a time filter for counting timing pulses read by said reading means and enabling said block generating means during intervals represented by preselected numbers of counted pulses.

14. A data handling system comprising a triggered multiplexor having an output signal sequentially representing analog data signals in each of a plurality of input channels and providing channel identifying signals, each said identifying signal representing the previously triggered input channel, clamp means responsive to said multiplexor for temporarily storing the value of said multiplexor output, a cyclic timer for generating cyclically repetitive groups of timing pulses, each group including a plurality of clock pulses mutually spaced at intervals greater than the interval between consecutive timing pulses, means for triggering said multiplexor from a selected pulse of each group, means for actuating said clamp means from a pulse of each group occurring subsequent to said multiplexor triggering pulse, an analog to digital converter responsive to said clamp means and controlled by said timing pulses for converting said stored value to digital form data signals, a buffer storage device, means for transferring said channel identifying signals of said multiplexor and said digital form data signals of said analog to digital converter to said buffer storage device in response to a selected pulse from each timing pulse group, means responsive to said plurality of clock pulses for consecutively gating mutually distinct sets of signals from said buffer storage device, said sets collectively forming a word, a recorder responsive to said gating means and having a plurality of write heads each connected to receive one signal of each of said sets whereby said sets of signals from said buffer storage are consecutively recorded, said recorder including a first timing head responsive to each of said clock pulses to indicate each set and a second timing head responsive to one of said clock pulses to indicate each word, reading means for reading the clock pulses recorded by at least one of said timing heads and for reading said recorded sets of signals, first and second system output devices, first and second data selection gating means for respectively gating to said system output devices the sets of signals read by said reading means, and means under control of the clock pulses read by said reading means for operating said data selection gating means.

15. A data handling system comprising a triggered multiplexor having an output signal sequentially representing analog data signals in each of a plurality of input channels and providing channel identifying signals, each said identifying signal representing the previously triggered input channel, clamp means responsive to said multiplexor for temporarily storing the value of said multiplexor output, a cyclic timer for generating cyclically repetitive groups of timing pulses, each group including a plurality of clock pulses mutually spaced at intervals greater than the interval between consecutive timing pulses, means for triggering said multiplexor from a selected pulse of each group, means for actuating said clamp means from a pulse of each group occurring subsequent to said multiplexor triggering pulse, an analog to digital converter responsive to said clamp means and controlled by said timing pulses for converting said stored value to digital form data signals, a buffer storage device, means for transferring said channel identifying signals of said multiplexor and said digital form data signals of said analog to digital converter to said buffer storage device in response to a selected pulse from each timing pulse group, means responsive to said plurality of clock pulses for consecutively gating mutually distinct sets of signals from said buffer storage device, said sets collectively forming a word, a recorder responsive to said gating means and having a plurality of write heads each connected to receive one signal from each of said sets whereby said sets of signals from said buffer storage are consecutively recorded, said recorder including a first timing head responsive to each of said clock pulses to indicate each set and a second timing head responsive to one of said clock pulses to indicate each word, reading means for reading the clock pulses recorded by at least one of said timing heads and for reading said recorded sets of signals, a system output device, a time filter for counting clock pulses read by said reading means and selectively controlling the flow of data from said reading means to said system output device for a preselected interval represented by preselected numbers of pulses counted thereby.

16. A data handling system comprising a multiplexor having an output signal sequentially representing analog data signals in a plurality of input channels and providing at least one identifying signal, clamp means responsive to said multiplexor for temporarily storing a value of said multiplexor output, a cyclic timer for generating groups of timing pulses, means for triggering said multiplexor from a selected pulse of each group, means for actuating said clamping means from a pulse of each group, an analog-to-digital converter responsive to said clamp means and controlled by said timing pulses for converting said stored value to digital form data signals, means for consequently gating mutually distinct sets of identifying and digital form signals from said multiplexor and converter within the period of each group of timing pulses, and a recorder responsive to said gating means and having a plurality of write heads each connected to receive one signal from each of said sets whereby said sets of identifying and digital form signals are consecutively recorded.

17. A data handling system comprising a multiplexor providing mutliplexor output signals and at least one identifying signal, clamp means for temporarily storing a value of said multiplexor output signal, converter means for changing said stored signal to digital form, means for transferring said identifying and digital form signals from said multiplexor and converter means in successive groups of mutually distinct consecutive sets, and time filter means for counting said sets and presenting for processing certain portions of said transfer signals selected according to the counting of a predetermined number of sets.

18. A data handling system comprising a multichannel multiplexor providing a multiplexor output, clamp means responsive to the multiplexor for temporarily storing a value of a signal passed by one channel of the multiplexor while a succeeding signal is being handled by the multiplexor, and converter means responsive to said clamp means for changing said stored signals to digital form.

19. A data handling system comprising a multichannel multiplexor providing a multiplexor output and channel identifying signals, clamp means responsive to said multiplexor for temporarily storing an instantaneous value of one signal presented by said multiplexor while the multiplexor is presenting a subsequent signal, said identifying signals each designating the signal temporarily stored in said clamp means, converter means for changing said stored signal to digital form, and transcribing means for presenting said channel identifying and digital form signals from said multiplexor and converter means in successive groups of mutually distinct consecutive sets.

20. A data handling system comprising a multiplexor providing multiplexor output signals and at least one identifying signal, converter means for changing said output to digital form, means for transferring said identifying and digital form signals from said multiplexor and converter means in successive groups of mutually distinct consecutive sets, means for including a word mark signal in a selected set of each group of sets, and time filter means for counting said transferred sets and presenting for processing portions of said transferred signals selected in accordance with the counting of preselected numbers of sets.

21. In a data handling system, a record having recorded thereon words of data, playback means for reading said data, first and second system output devices, first and second data selection gating means for respectively transferring to said system output devices the data read by said playback means, block generating means for counting words read by said playback means and alternately operating said first and second data selection means for periods represented by preselected numbers of words whereby blocks of said words are alternately transferred to said first and second system output devices, and a time filter having means for setting start and stop numbers therein and for counting words read by said playback means, said time filter including means for enabling the transfer of data to said output devices for a period determined by comparison of said start and stop numbers with the number of words counted by said time filters.

References Cited by the Examiner
UNITED STATES PATENTS

| | | | |
|---|---|---|---|
| 2,559,499 | 7/1951 | Gillette et al. | |
| 2,566,078 | 8/1951 | Bliss | 346—33 |
| 2,573,813 | 11/1951 | Shumard. | |
| 2,576,026 | 11/1951 | Meacham | 307—88.5 |
| 2,627,039 | 1/1953 | MacWilliams | 340—166 |
| 2,631,778 | 3/1953 | Piper | 340—347 X |
| 2,648,829 | 8/1953 | Ayers et al. | 340—147 |
| 2,656,524 | 10/1953 | Gridley et al. | 340—206 |
| 2,671,169 | 3/1954 | Norton. | |
| 2,680,240 | 6/1954 | Greenfield | 340—147 |
| 2,693,534 | 11/1954 | Bertram. | |
| 2,706,811 | 4/1955 | Steele | 340—166 |
| 2,717,370 | 9/1955 | Piper | 340—151 |
| 2,719,959 | 10/1955 | Hobbs | 340—147 |
| 2,733,432 | 1/1956 | Brechman | 340—347 |
| 2,771,596 | 11/1956 | Bellamy | 340—174 |
| 2,775,754 | 12/1956 | Sink | 340—347 |
| 2,796,314 | 6/1957 | Bishop et al. | 346—33 |
| 2,807,005 | 9/1957 | Weidenhammer | 340—174 |
| 2,817,772 | 12/1957 | Lee | 307—88.5 |
| 2,886,802 | 5/1959 | Henning et al. | 340—374 |
| 2,905,930 | 9/1959 | Golden | 340—172.5 |
| 2,918,657 | 12/1959 | Crampton et al. | 340—174 |
| 2,922,900 | 1/1960 | Anderson | 340—174 |
| 2,941,188 | 6/1960 | Flechtner | 340—174 |

OTHER REFERENCES

"A Numerically Controlled Milling Machine," by J. C. McDonough and A. W. Susskind, Review of Input and Output Equipment Used in Computing Systems, Joint AIEE-URE-ACM Computer Conference, March 1953, pp. 133–136 (FIG. 2 relied on).

ROBERT C. BAILEY, *Primary Examiner.*

EVERETT R. REYNOLDS, STEPHEN W. CAPELLI,
*Examiners.*

IRVING L. SRAGOW, MALCOLM A. MORRISON,
*Assistant Examiners.*